United States Patent [19]
Schaffert

[11] Patent Number: 6,082,275
[45] Date of Patent: *Jul. 4, 2000

[54] EXTENSION FOR REDUCING SEED BOUNCE AND ASSOCIATED ATTACHMENT BRACKETS

[76] Inventor: Paul E. Schaffert, R.R. 1, Box 157, Indianola, Nebr. 69034

[*] Notice: This patent is subject to a terminal disclaimer.

[21] Appl. No.: 08/881,177

[22] Filed: Jun. 23, 1997

Related U.S. Application Data

[63] Continuation-in-part of application No. 08/550,088, Oct. 30, 1995, Pat. No. 5,640,915.

[51] Int. Cl.$^7$ ...................................................... A01C 5/00
[52] U.S. Cl. ........................... 111/150; 111/164; 111/200
[58] Field of Search ........................... 111/150, 164, 111/200, 167, 170, 189, 197, 154, 155, 149, 157, 163, 168, 190; 403/298, 359, 375, 104, 374; 172/570, 156

[56] References Cited

U.S. PATENT DOCUMENTS

| | | | |
|---|---|---|---|
| 13,683 | 10/1855 | McCormick | 111/170 |
| 35,510 | 6/1862 | DeHaven . | |
| 122,299 | 12/1871 | Wicht et al. | 111/154 X |
| 176,708 | 4/1876 | Templin | 111/170 X |
| 183,947 | 10/1876 | Lewis | 111/150 X |
| 203,207 | 4/1878 | Springer | 111/150 X |
| 211,601 | 1/1879 | Springer | 111/190 |
| 221,004 | 10/1879 | Strayer | 111/150 X |
| 252,265 | 1/1882 | Scofield . | |
| D. 285,205 | 8/1986 | Johnson | 111/154 X |
| 308,327 | 11/1884 | Runstetler | 111/190 |
| 410,438 | 9/1889 | Patric et al. . | |
| 789,798 | 5/1905 | Deterding | 111/197 |
| 889,947 | 6/1908 | Miller . | |
| 909,137 | 1/1909 | Bellerive | 111/167 X |
| 1,104,602 | 7/1914 | Akers | 111/190 |
| 1,691,466 | 11/1928 | Burtner . | |
| 1,934,490 | 11/1933 | Elliott . | |
| 2,096,230 | 10/1937 | Elliot . | |
| 2,533,374 | 12/1950 | Hyland | 111/150 |
| 2,849,969 | 9/1958 | Taylor | 111/190 |
| 2,872,883 | 2/1959 | Padrick . | |
| 3,182,345 | 5/1965 | Smith | 403/375 X |
| 4,253,412 | 3/1981 | Hogenson | 111/150 |
| 4,276,836 | 7/1981 | Pust | 111/150 |
| 4,373,455 | 2/1983 | Friggstad . | |
| 4,420,516 | 12/1983 | Ermert et al. . | |
| 4,446,801 | 5/1984 | Machnee et al. . | |
| 4,580,507 | 4/1986 | Dreyer et al. | 111/150 X |
| 4,779,674 | 10/1988 | McNulty | 403/374 X |
| 4,911,090 | 3/1990 | Schimke . | |
| 5,092,255 | 3/1992 | Long et al. | 111/167 |
| 5,375,542 | 12/1994 | Schaffert | 111/192 |
| 5,425,318 | 6/1995 | Keeton | 111/197 |
| 5,640,915 | 6/1997 | Schaffert | 111/150 |
| 5,673,638 | 10/1997 | Keeton | 111/167 |

OTHER PUBLICATIONS

Keeton Seed Firmer; J & K Enterprises (1994 brochure).
Tube Alignment Brackets; M & J Cotton Farms, Inc. Brochure.
Finck, Charlene; Put Seed In Its Place; Farm Journal pp. 16–17 (Jan. 1995).
Seed to Soil Inforcer; Seed Flap (Spring 1995).

*Primary Examiner*—Victor Batson
*Attorney, Agent, or Firm*—Holland & Hart LLP

[57] ABSTRACT

An extension for use with a furrow opener is disclosed for properly placing seeds in a furrow. The extension attaches by way of particular attachment brackets to the furrow opener to help direct bouncing seeds into the vertex in the bottom portion of the furrow. The extension comprises an elongated flexible body member defining a general arcuate shape, and also defines an upper segment and a lower segment. The upper segment defines an attachment structure for releasable engagement to the furrow opener. The lower segment depends downwardly and rearwardly from the furrow opener and extends into the furrow. The lower segment has a width dimension decreasing continuously along its length, the width dimension substantially equal to but less than the width of the furrow along the length of the extension. The lower segment terminates at a trailing end, which is spaced above the centrally located bottom portion of the furrow.

27 Claims, 27 Drawing Sheets

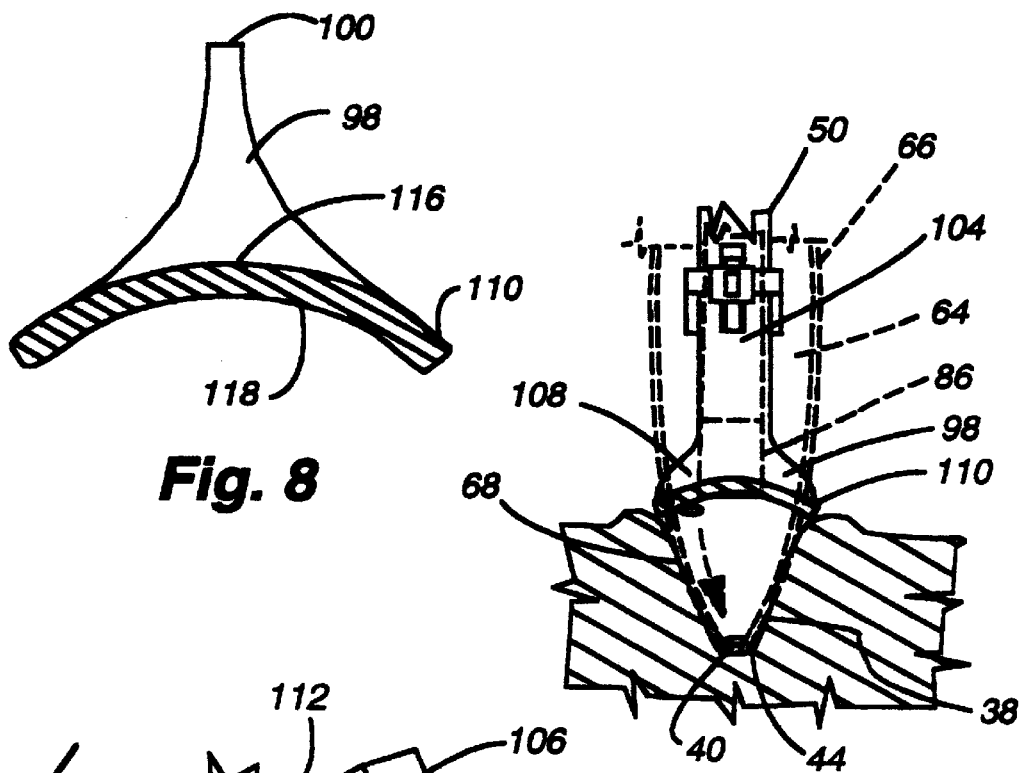
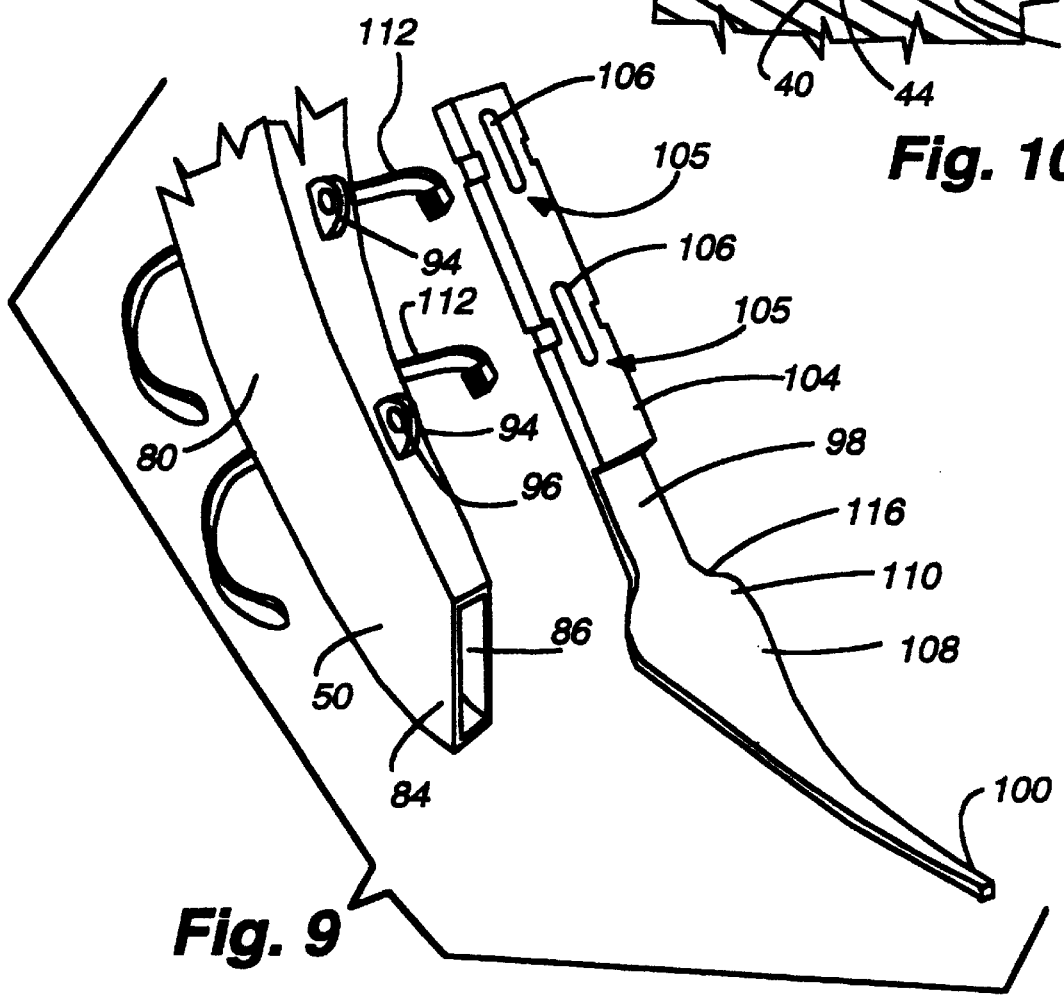

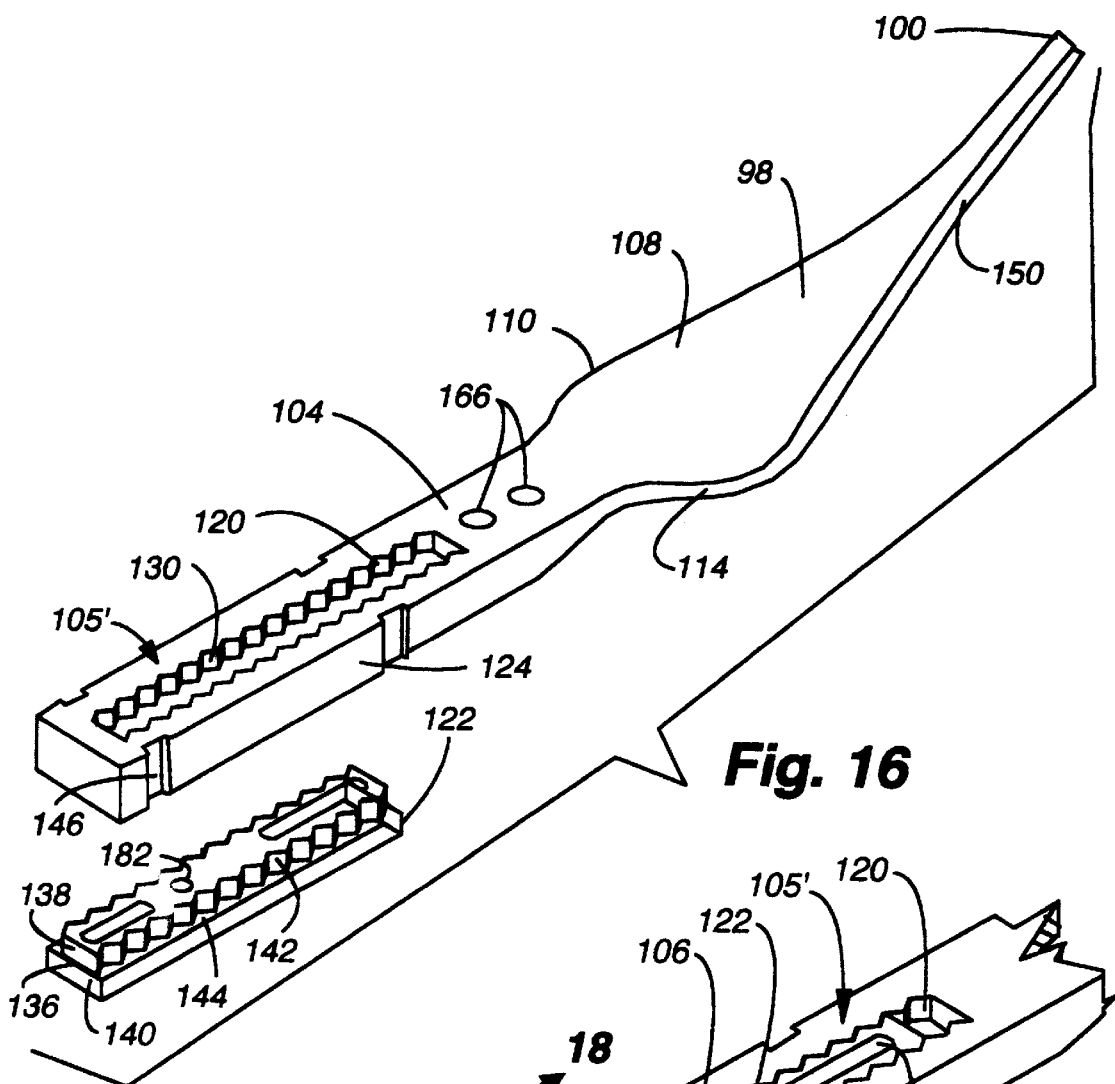
*Fig. 16*
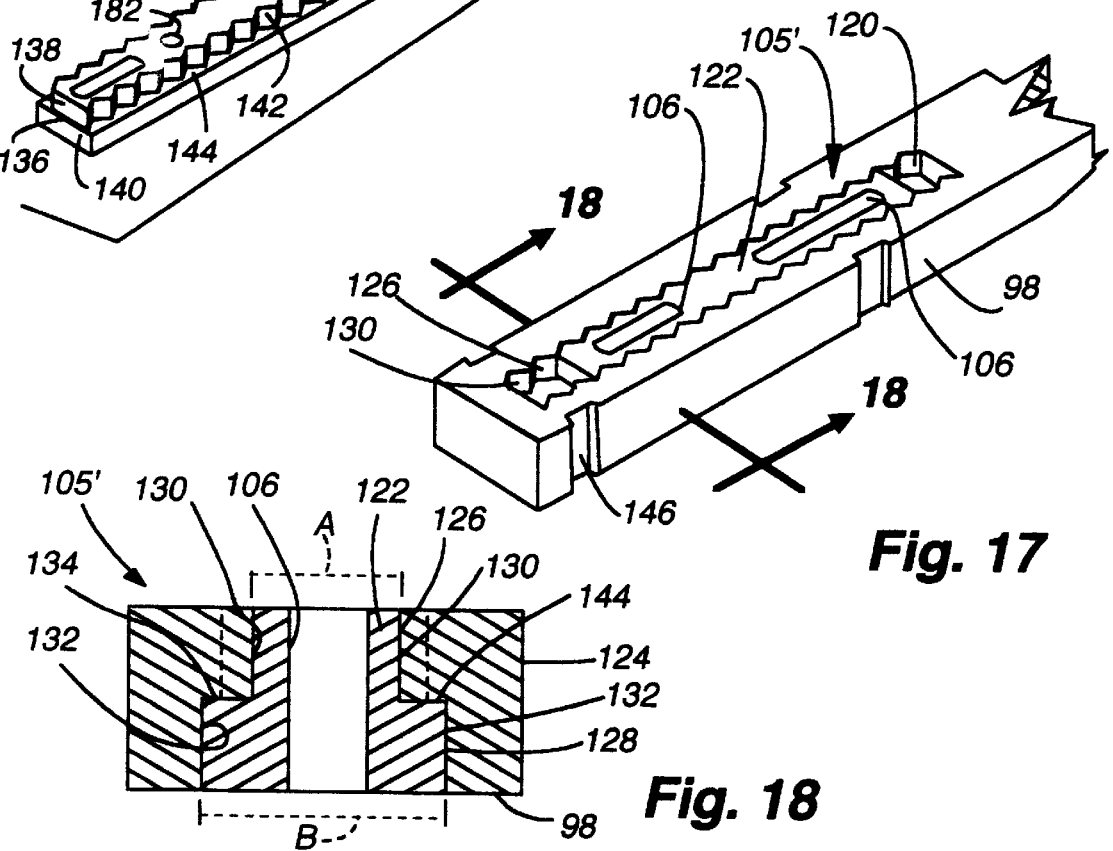
*Fig. 17*
*Fig. 18*

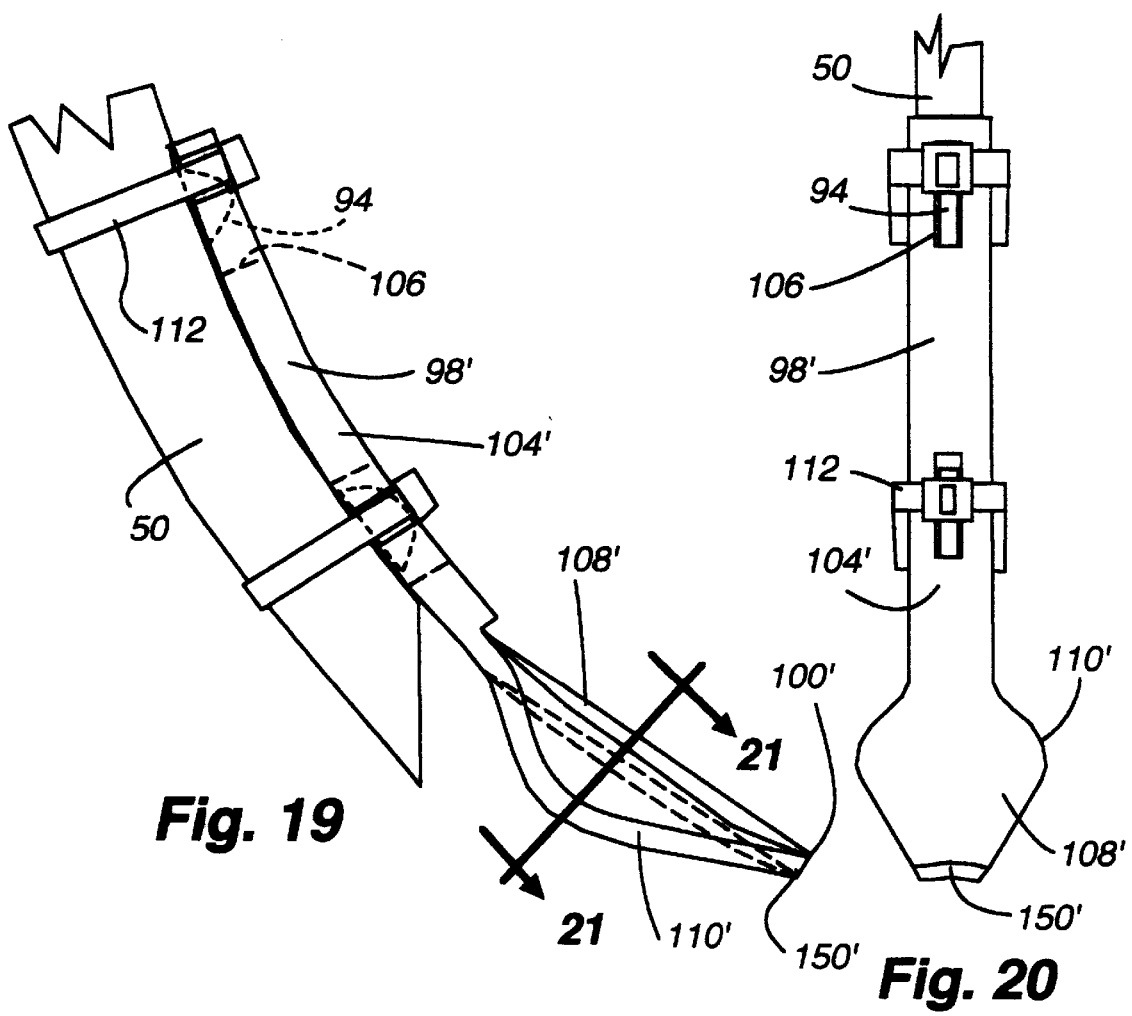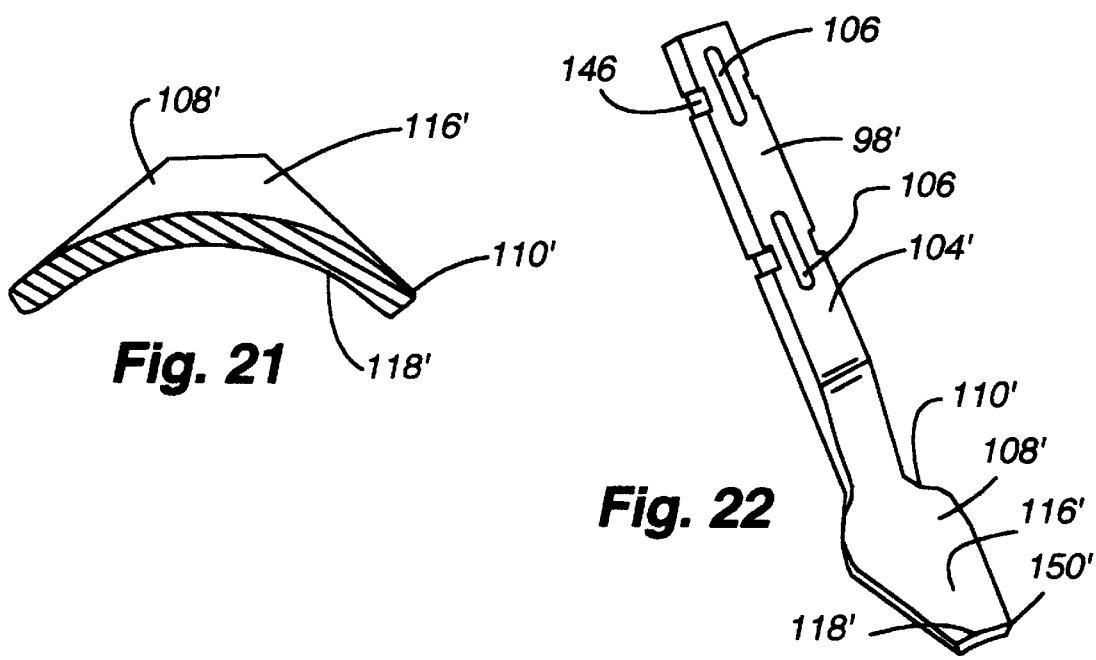

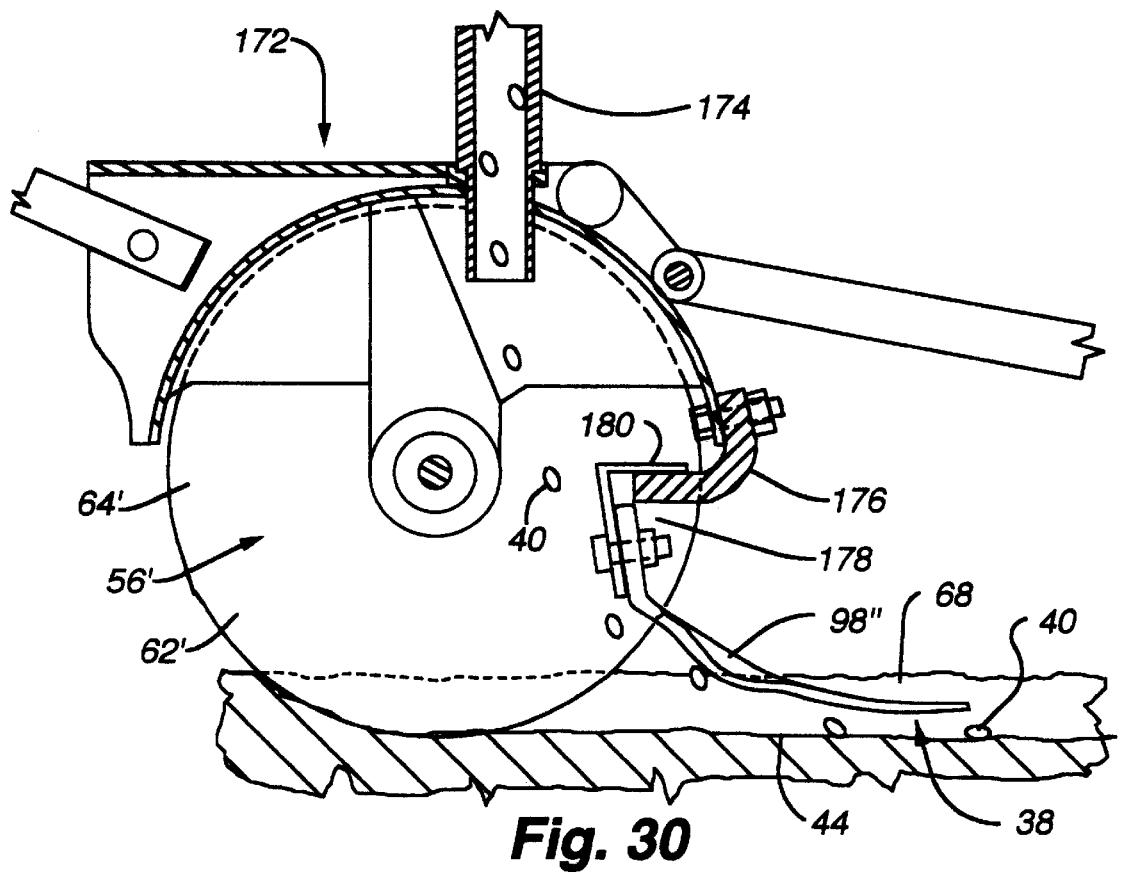
Fig. 30
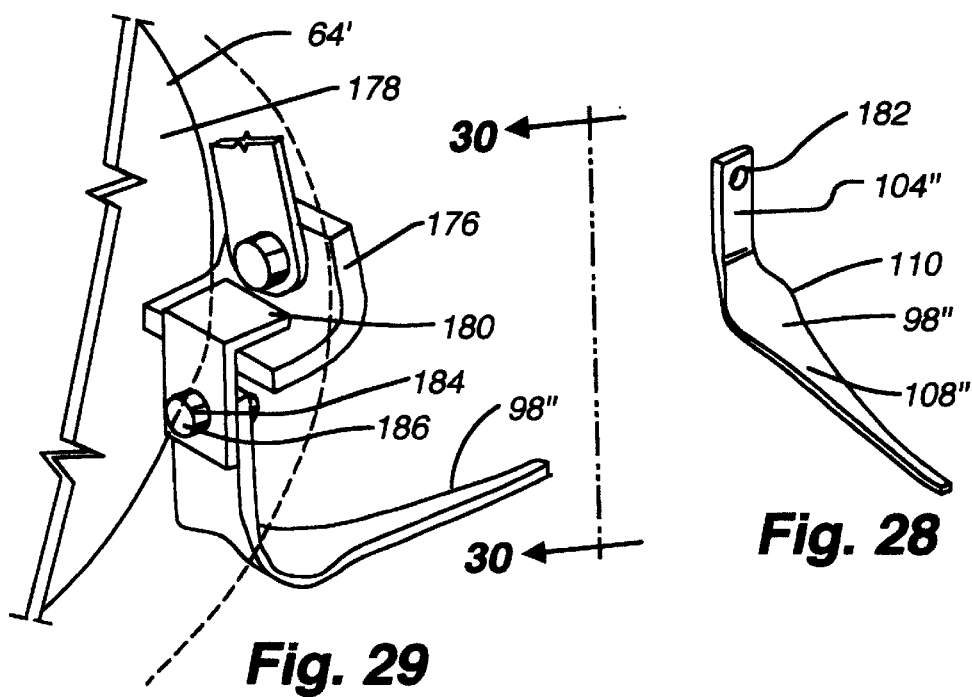
Fig. 29
Fig. 28

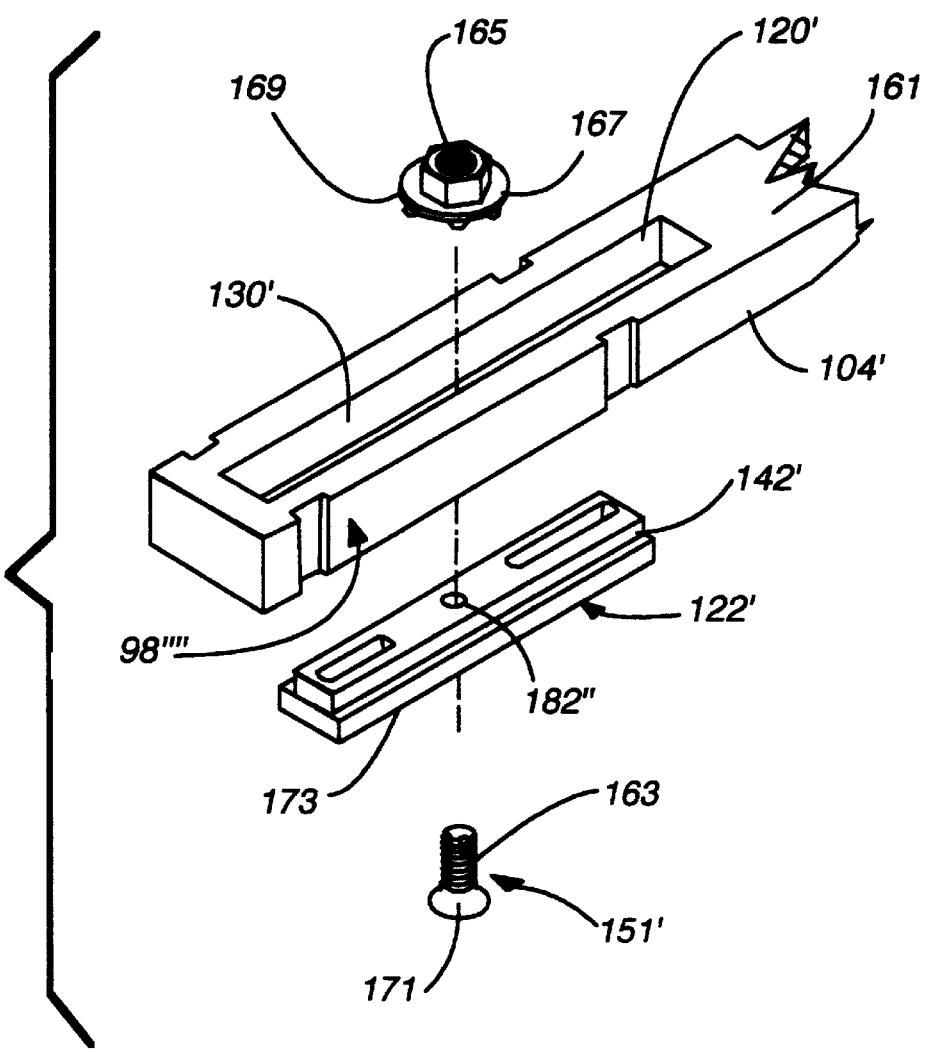

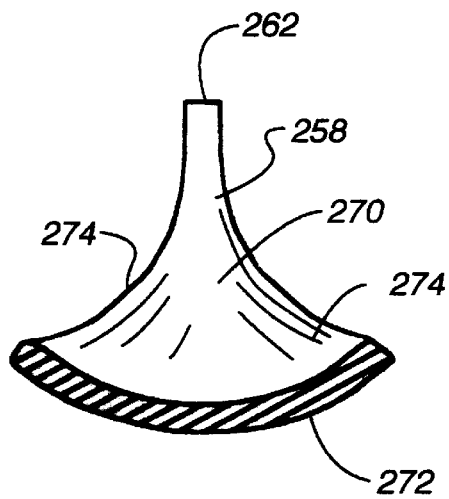
Fig. 37
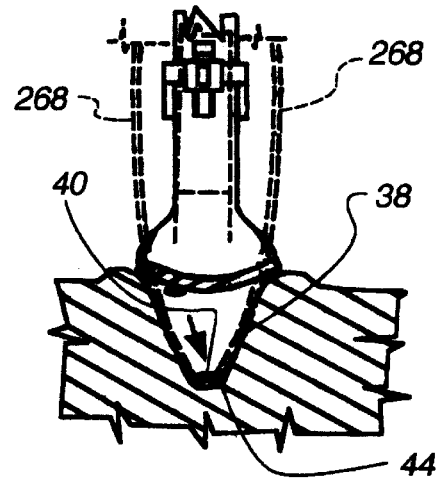
Fig. 36
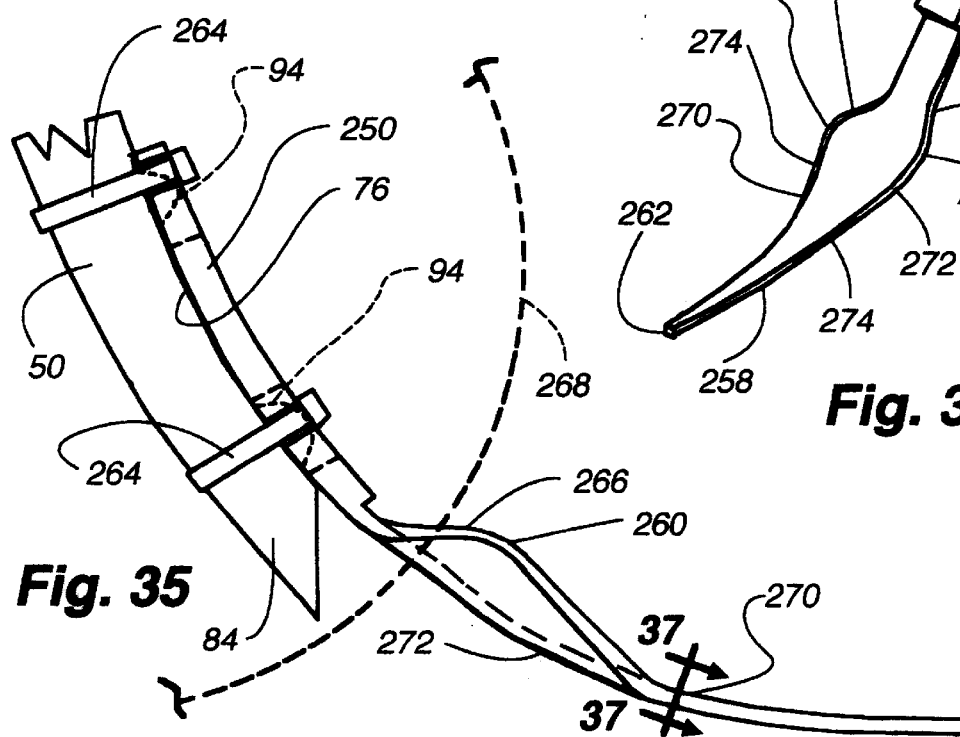
Fig. 34
Fig. 35

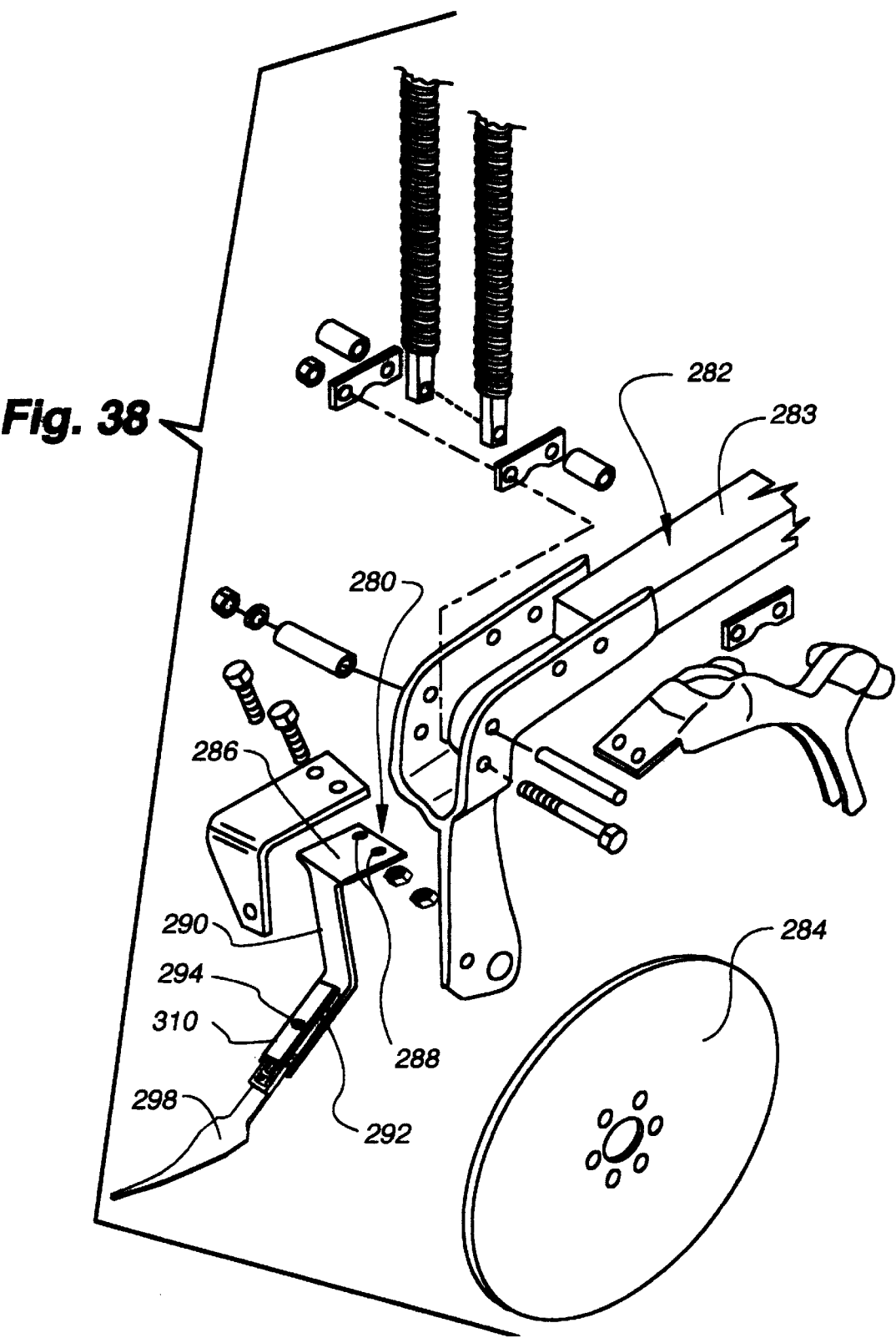

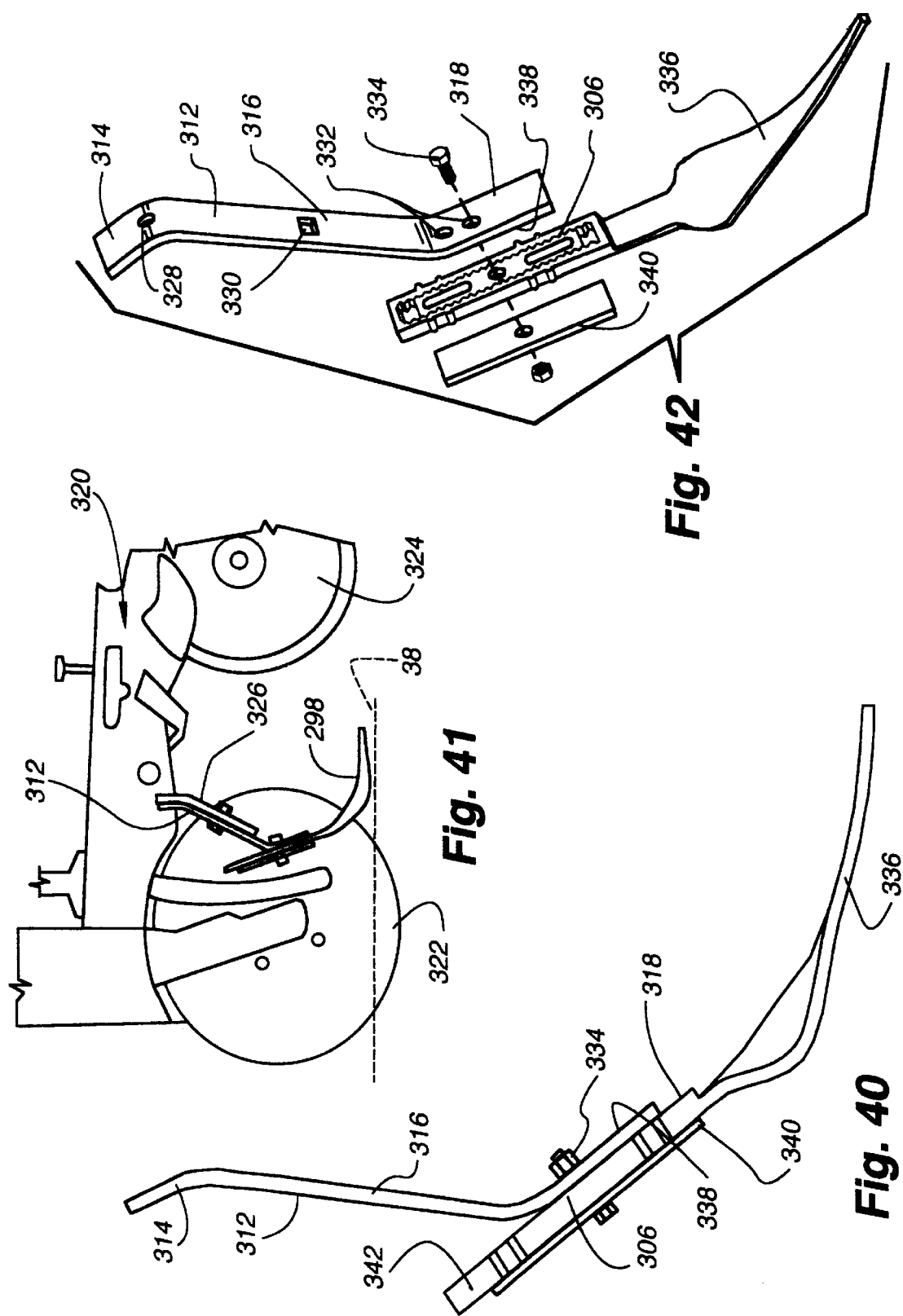

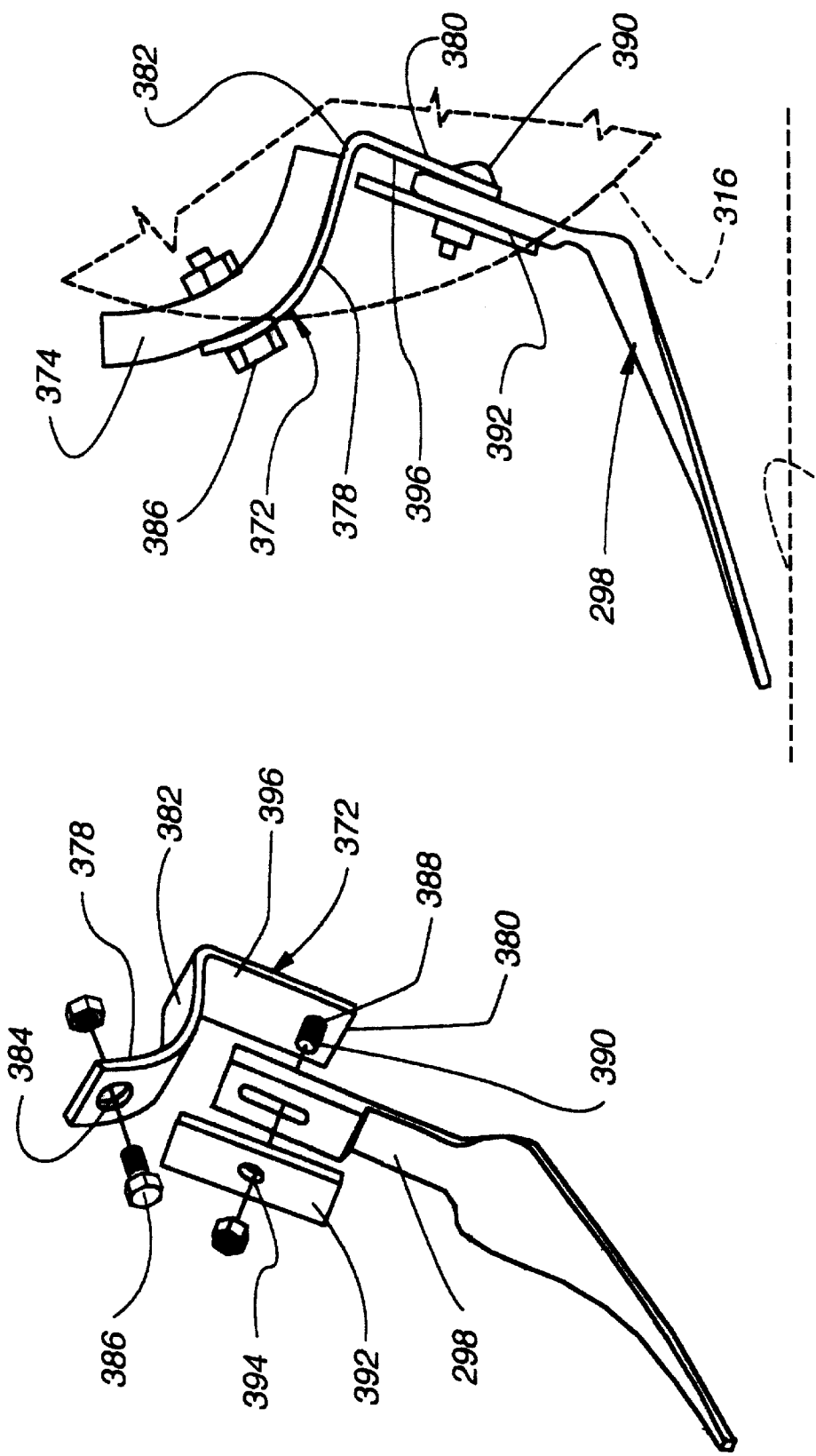

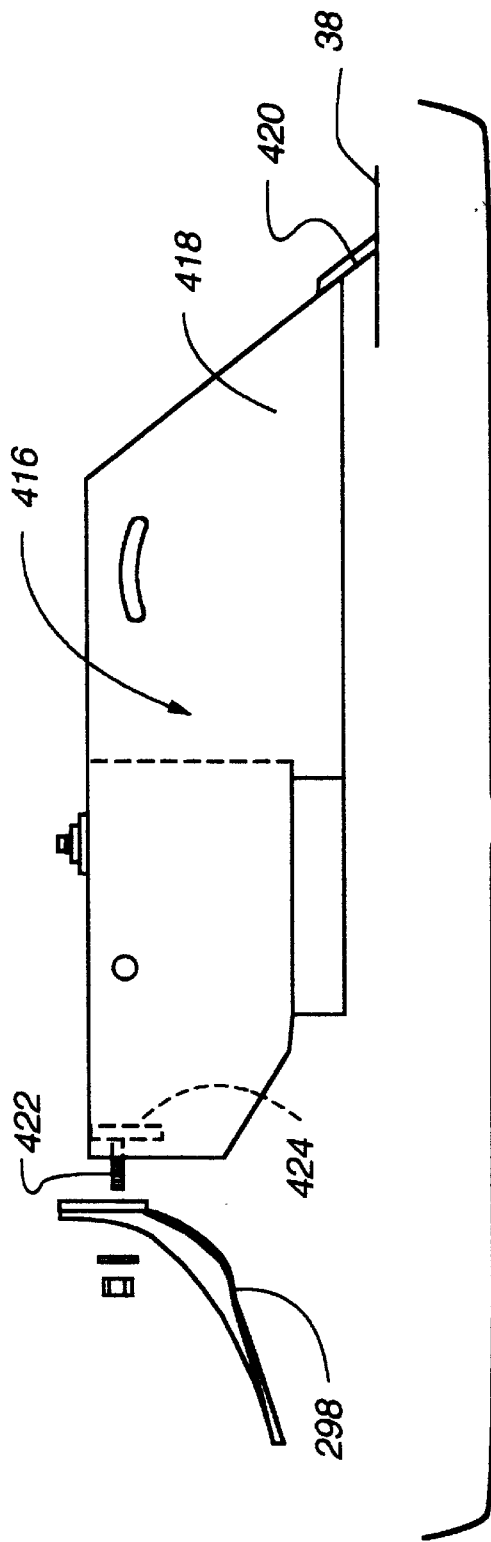
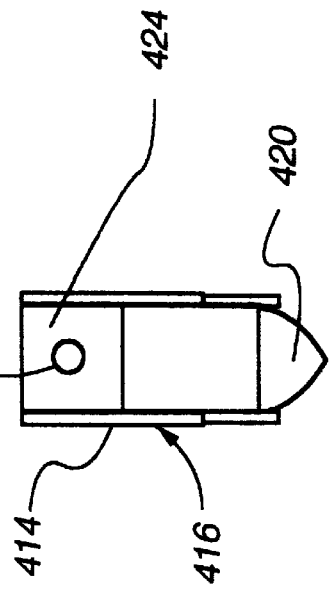
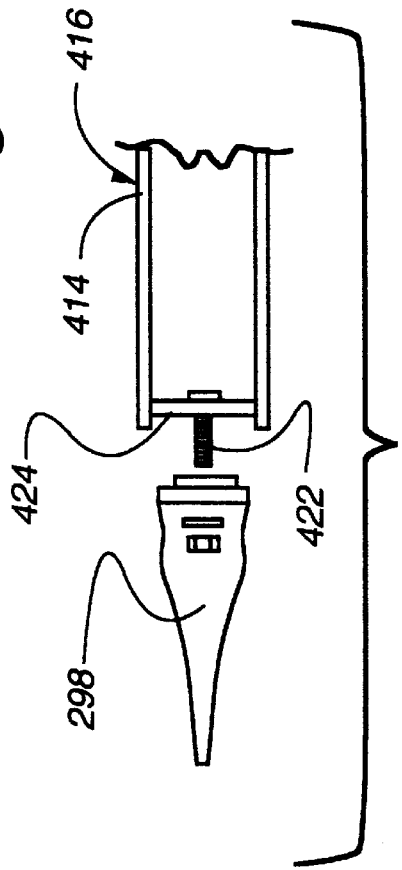
Fig. 49a
Fig. 49b
Fig. 49c

EXTENSION FOR REDUCING SEED BOUNCE AND ASSOCIATED ATTACHMENT BRACKETS

CROSS-REFERENCE TO RELATED APPLICATIONS

This application is a continuation-in-part of U.S. patent application Ser. No. 08/550,088, filed Oct. 30, 1995, now U.S. Pat. No. 5,640,915.

FIELD OF THE INVENTION

This invention relates to agricultural seed planters and drills and more particularly to seed planters and drills which include apparatus adapted to place seeds properly within a seed furrow.

BACKGROUND OF THE INVENTION

Agricultural seed planting is typically accomplished by multi-row planters and drills. Each planter and drill comprise a plurality of row units adapted for opening a seed furrow, depositing seeds within the seed furrow, and closing the seed furrow around the seeds. Additionally, many other attachments, such as chemical applicators, may be added to the row units.

The placement of a seed in a furrow greatly affects the growth characteristics of the plant. The seed drops from the planter into the furrow through a seed tube. The seed tube is designed and positioned on the planter to drop the seed into the bottom of the furrow, however, as the seeds pass through the seed tube, they are prone to bouncing, which affects the direction at which they leave the seed tube and fall into the furrow. Also, seeds often bounce off of the soil when dropped into the bottom of the seed furrow because of the speed with which they drop to the ground.

When the seeds bounce either as they exit the seed tube or after they strike the ground, the seeds are likely to come to rest on a side of the seed furrow above the bottom, or even outside of the furrow. After the seed is placed in the furrow, the furrow is closed by furrow closers to cover the seeds with soil and form a seed bed. If the seeds are improperly placed in the furrow, the seeds are in turn likely to be covered by an inadequate layer of soil. The depth that seeds are placed in the soil affects many growth aspects of the resulting plant.

Thus, improper seed placement in the furrow and the resulting affected soil coverage causes uneven plant emergence, poor stands, increased weed population, non-uniform maturity, longer insect life cycles, higher susceptibility to chemical damage, and ultimately lower yields.

Attempts to reduce seed bounce include moving the planter at a slower velocity. The slower planter velocity decreases the velocity at which the seed strikes the soil, and also decreases the bouncing of the seed as it falls through the seed tube, both in turn reducing the amount of bounce to which the seed is subjected. Planting at a slower rate, however, increases the amount of time it takes to plant a given size field, thus affecting the farmer's efficiency and his ability to take advantage of proper planting conditions.

Other attempts to reduce seed bounce have been developed, including U.S. Pat. No. 5,092,255, issued to Long et al. The Long patent discloses a strap that mounts to and extends beyond the end of the seed tube. The strap is flexible and has a flat transverse section, with a continuous width of approximately the width of a furrow. The strap extends into the furrow and is in contact with the soil at all times. During use, the strap bends rearwardly into an arcuate shape along its length as a result of being in contact with the soil. It appears that the strap is designed to contact the seed when the seed is resting in the soil, thereby potentially damaging the seed. The constant contact with the soil can also adversely affect the profile shape of the furrow.

Other devices have been developed, such as the device disclosed in U.S. Pat. No. 5,425,318, issued to Keeton. The Keeton device is disclosed as reducing seed bounce and providing consistent seed depth and spacing.

The Keeton device extends from the seed tube rearwardly and downwardly to contact the bottom of the furrow in order to press the seed into the soil. The Keeton device has varying flexibility along its length so that the device is flexible in the middle and rigid at the leading and trailing ends. The rigid trailing end presses the seed into the soil. The Keeton device subjects the seed to unnecessary and undesirable contact after the seed has come to rest in the trench, causing potentially detrimental impact on the seed, such as seed coat damage, or seed bruising. Damaging the seed in any way can kill the seed, and thus greatly affects the stand count. The Keeton device also trails far behind the opener disks and seed tube, and can interfere with the apparatus used to close the furrow.

It is to overcome the shortcomings of the prior art that the present invention was developed.

SUMMARY OF THE INVENTION

It is the principal object of the present invention to provide a new extension for use with an agricultural seed planter or drill.

Another object of the present invention is to provide an extension of the foregoing type which reduces seed bounce.

Another object of the present invention is to provide an extension of the foregoing type which directs bouncing seeds into the bottom of a seed furrow.

Another object of the present invention is to provide an extension of the foregoing type which guides the seeds to the bottom of the seed furrow without damaging the seed.

Another object of the present invention is to provide an extension of the foregoing type which is effective in all soil types and which may be used with all known seed planter attachments.

Another object of the present invention is to provide an extension of the foregoing type which is sturdy and durable but which may be quickly and easily added to existing seed planters or drills.

Other objects of the present invention will become apparent from the following description and accompanying drawings.

The present invention is embodied in an extension for use with a furrow opener for properly placing seeds in a furrow. A furrow opener creates a seed furrow, places seeds within the seed furrow, and utilizes a closing device for closing seed furrow to form a seed bed. The seed furrow has a centrally located bottom portion and upwardly and outwardly extending sidewalls defining a maximum width dimension, the sidewalls intersecting at a vertex in the bottom portion to define a minimum width dimension.

The extension attaches to the furrow opener to help direct bouncing seeds into the vertex in the bottom portion of the furrow. The extension comprises an elongated flexible body member defining a general arcuate shape, and also defines an upper segment and a lower segment. The upper segment defines an attachment structure for releasable engagement to the furrow opener. The lower segment depends downwardly and rearwardly from the furrow opener and extends into the furrow. The lower segment has a width dimension decreasing continuously along its length, the width dimension substantially equal to but less than the width of the furrow along the length of the extension. The extension does not contact the furrow. The lower segment terminates at a trailing end, and is spaced above the centrally located bottom portion of the furrow.

The lower segment of the extension has a downwardly facing concave lower surface which transforms along the length of the bottom segment to a downwardly facing planar lower surface at the trailing end. The lower segment can also define laterally extending and downwardly curving shoulder flanges.

An alternative embodiment of the extension has a downwardly facing convex lower surface which transforms along the length of the bottom segment to a downwardly facing planar lower surface at the trailing end. The lower segment of this alternative embodiment can also define laterally extending and upwardly curving shoulder flanges.

Attachment brackets for connecting the extension to various planters and drills are described also. The brackets allow the proper positioning of the extension with respect to the planter or drill, in addition to the proper placement of the extension in the furrow itself. Each of the brackets include a downwardly and rearwardly extending section for receiving the top portion of the extension.

In more detail, an attachment assembly is disclosed for properly placing seeds in a furrow for use with a drill having a furrow opener with at least one disk blade for creating a seed furrow. The extension assembly also includes a chute for dropping the seeds into the seed furrow. The extension assembly includes a bracket having an upper end and a lower end, the upper end for attachment to the drill and the lower end extending downwardly and rearwardly from the drill, an extension including an elongated body member which provides a generally downwardly and rearwardly orientation, and also defining a upper segment and a lower segment, the upper segment attachable to the lower end of the bracket, the lower segment configured to depend downwardly and rearwardly from the bracket and extendible to the furrow.

Particularly, an attachment assembly is disclosed for an International Harvester type drills wherein the bracket further comprises a top segment, middle segment, and bottom segment, the middle segment formed at substantially a right angle to the top segment, the bottom segment formed at substantially an obtuse angle to the middle segment, said extension being attached to said bottom segment; wherein said bracket positions said extension in the furrow when attached to the drill, and where the bottom segment of the bracket extends downwardly and rearwardly of the drill.

An alternative attachment assembly for a Great Plains type drill is disclosed wherein the bracket further comprises a top segment, middle segment, and bottom segment, the top segment attachable to the drill, the middle segment formed at a substantially obtuse angle to and depending downwardly from the top segment, the bottom segment formed at substantially an obtuse angle to and extends downwardly and rearwardly away from the middle segment, the extension being attached to the bottom segment and wherein the bracket positions the extension in the furrow.

An alternative attachment assembly for a John Deere type drills is disclosed wherein the bracket further comprises a top segment, middle segment, and bottom segment, the top segment attachable to the drill, the middle segment formed at a substantially obtuse angle to and depending forwardly and upwardly from the top segment, the bottom segment formed at substantially an acute angle to and extends downwardly and rearwardly away from the middle segment, the extension being attached to the bottom segment; wherein the bracket positions the extension in the furrow.

An alternative attachment assembly for a Tye type drill is disclosed wherein the bracket further includes a top segment, and a bottom segment, the top segment attachable to the drill and curving downwardly and forwardly, the bottom segment formed at a substantially right angle to and depending downwardly away from the middle segment, the extension being attached to the bottom segment, wherein the bracket positions the extension in the furrow.

A more complete appreciation of the present invention and its scope can be obtained from understanding the accompanying drawings, which are briefly summarized below, the following detailed description of a presently preferred embodiment of the invention, and the appended claims.

BRIEF DESCRIPTION OF THE DRAWINGS

FIG. 8 is an enlarged section taken along line 8—8 of FIG. 6.

FIG. 9 is an exploded view of the extension of the present invention, illustrating the extension, the seed tube, and releasable fasteners for releasably attaching the extension to the seed tube.

FIG. 10 is an enlarged section view taken along line 10—10 of FIG. 3.

FIG. 16 is an exploded view of the extension of the present invention illustrating the slot formed in the top segment, and an insert for positioning in the slot.

FIG. 17 is an enlarged perspective view of the top segment of the extension of the present invention, illustrating the insert positioned in the slot.

FIG. 18 is a section taken along line 18—18 of FIG. 17.

FIG. 19 is an enlarged partial side view of the alternative embodiment of the extension of the present invention, as shown in FIG. 15, as mounted on the seed tube.

FIG. 20 is an enlarged partial rear view of the alternative embodiment of the extension of the present invention, as shown on FIG. 19, as mounted on the seed tube.

FIG. 21 is a section taken along line 21—21 of FIG. 19.

FIG. 22 is a perspective view of the alternative embodiment of the extension of the present invention as shown in FIG. 19.

FIG. 28 is a perspective view of another alternative embodiment of the present invention, illustrating a sharper angle between the top segment and the bottom segment, as well as an aperture formed through the top segment.

FIG. 29 is a front perspective view of the alternative embodiment of the present invention as shown in FIG. 28.

FIG. 30 is a section view taken along line 30—30 of FIG. 29.

FIG. 33 is an enlarged exploded perspective view of an alternative embodiment of the mounting structure as shown in FIG. 31.

FIG. 34 is an alternative embodiment of the extension of the present invention, including an upwardly concave top surface and a convex lower surface.

FIG. 35 is a representational side view similar to FIG. 6 illustrating the attachment of the alternative embodiment to the seed tube.

FIG. 36 is a representation similar to FIG. 10 illustrating the position of the top part of the bottom portion of the extension in the furrow.

FIG. 37 is a section taken along line 37—37 of FIG. 35.

FIG. 38 is an exploded view of an International Harvester type drill to which the extension is attached.

FIG. 40 shows the extension attached to a bracket for connecting the extension to a Great Plains type drill.

FIG. 41 is a representational view of a Great Plains type drill with the bracket and extension attached thereto.

FIG. 42 is an exploded view of the bracket and extension as shown in FIG. 40.

FIG. 45 is an exploded view of a bracket for use in attaching the extension to a Tye model drill.

FIG. 46 is a representational view of the bracket and extension shown in FIG. 45 attached to the scraper of a Tye model drill.

FIG. 49 shows an exploded view and attachment assembly for attaching an extension to a runner/opener.

DETAILED DESCRIPTION OF THE PREFERRED EMBODIMENT

While the device of the instant invention can be used with a variety of planters and drills, it will be initially described in this instance as used with a double disk furrow opener style planter as described below.

Figure 1:
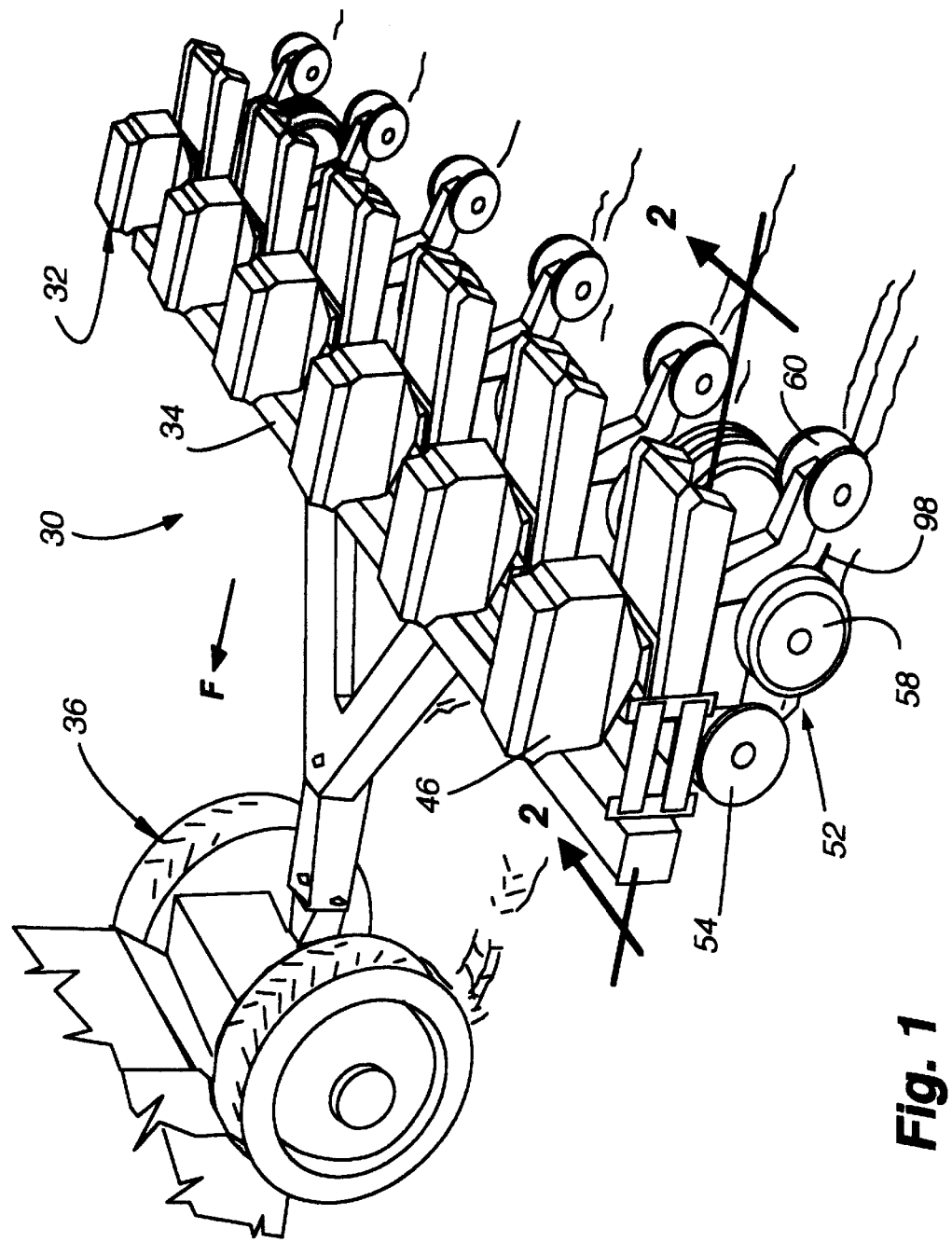
FIG. 1 is a perspective view of a planter encompassing the instant invention, and illustrates a tractor pulling a planter made up of a plurality of row units.

An agricultural planter 30, shown in FIG. 1, typically includes a number of planter row units 32 mounted on a main frame member 34. The planter 30 is pulled in a forward direction F by a tractor 36. Each row unit 32 forms a seed furrow 38 (see FIG. 2), deposits seeds 40 evenly along the seed furrow, and then closes the seed furrow to form a seed bed 42. The present invention is embodied in a seed placement extension 98, shown in FIGS. 1–3, which reduces seed bounce as the seeds 40 exit the row unit 32, and helps position the seeds 40 optimally in the bottom portion 44 of the furrow 38 prior to closure of the furrow by the row unit 32.

Figure 2:
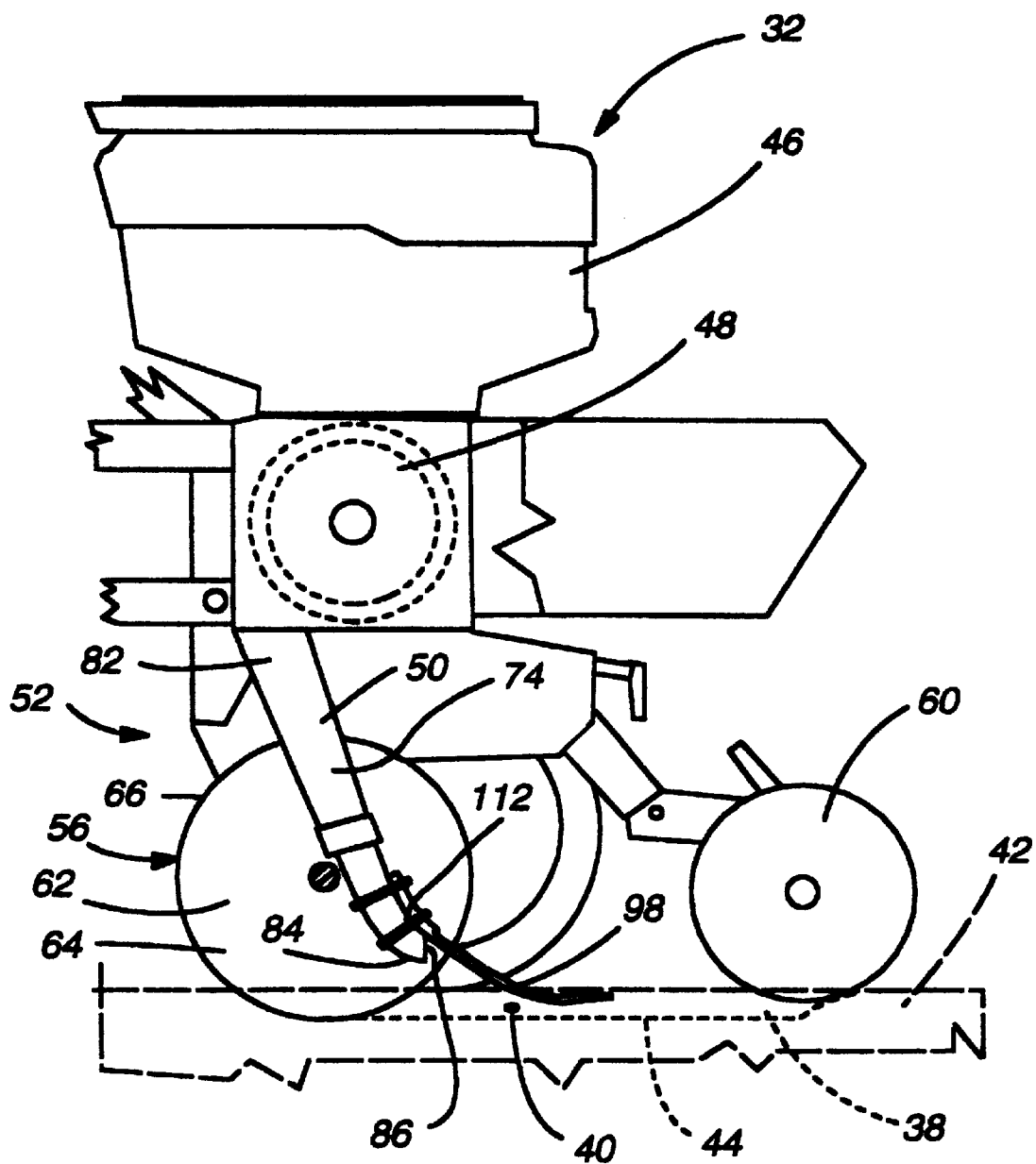
FIG. 2 is a section taken along line 2—2 of FIG. 1, and illustrates a row unit having a hopper, a metering unit, a gage wheel, a closing wheel, a disk blade forming a furrow, and a seed tube depending from the metering unit, with the extension of the present invention depending from the seed tube.

Each row unit 32, as seen in FIGS. 1 and 2, comprises a seed hopper 46 for holding and dispensing seeds 40, a seed metering unit 48 positioned below the seed hopper 46 and which receives seeds from the seed hopper, and a seed tube 50 positioned below the seed metering unit 48 and which receives seeds 40 from the metering unit to place in the furrow 38. A furrow opening apparatus 52 is positioned generally beneath the seed hopper 46, and includes a residue divider 54 at the leading edge of the row unit 32, and a furrow opener 56 positioned more centrally under the hopper 46. The furrow opener 56 is partially encompassed by a pair of gage wheels 58, and a pair of furrow closer wheels 60 which trail behind the furrow opener 56 and gage wheels 58.

The seed furrow 38 is formed by the furrow opener 56 attached to each row unit 32. Although numerous types of openers are known in the art, a double disk furrow opener 62 is shown in FIGS. 2, 3, 10 and 11. The double disk opener 62 includes two circular disk blades 64 rotatably mounted on the row unit 32 to form a V-shape at the point of seed placement. The disk blades 64 have a diameter, and the peripheral edges 66 of each disk blade 64 are adjacent to one another at the point where they form the V. The gage wheels 58 flank the disk blades 64 to support the row unit 32 and allow the disk blades 64 to mold a V-shaped seed furrow 38 at a predetermined depth within the soil.

Figure 3:
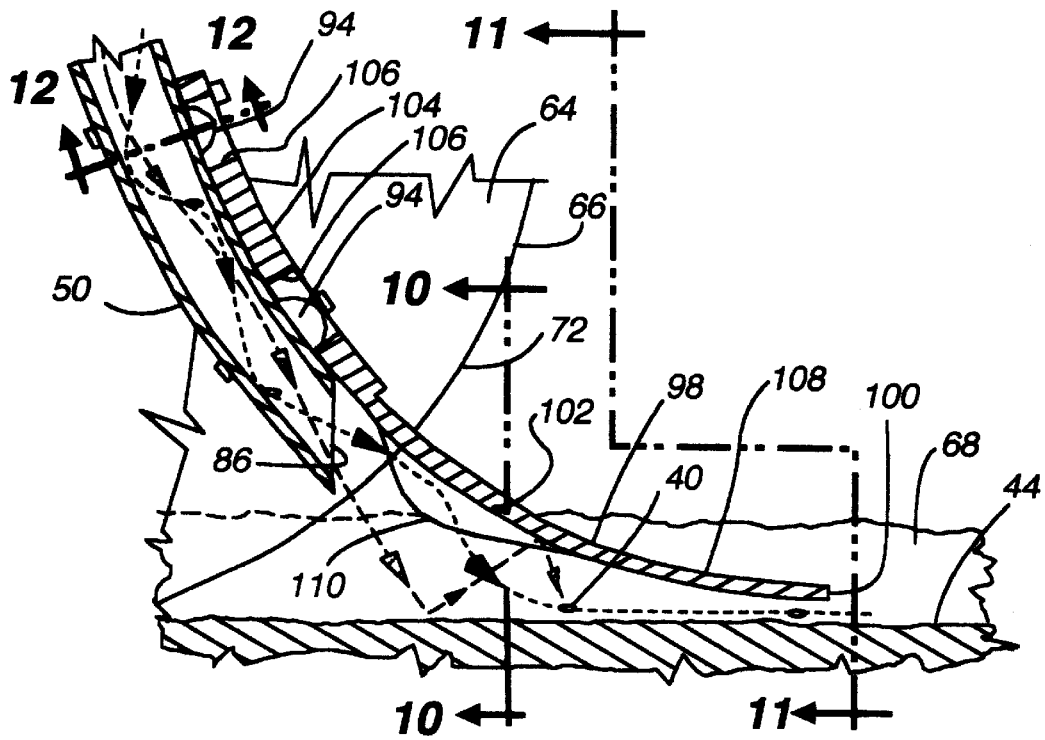
FIG. 3 is an enlarged representative section illustrating the extension of the present invention attached to the seed tube and extending into the furrow, and seeds falling through the seed tube into the furrow.
Figure 4:
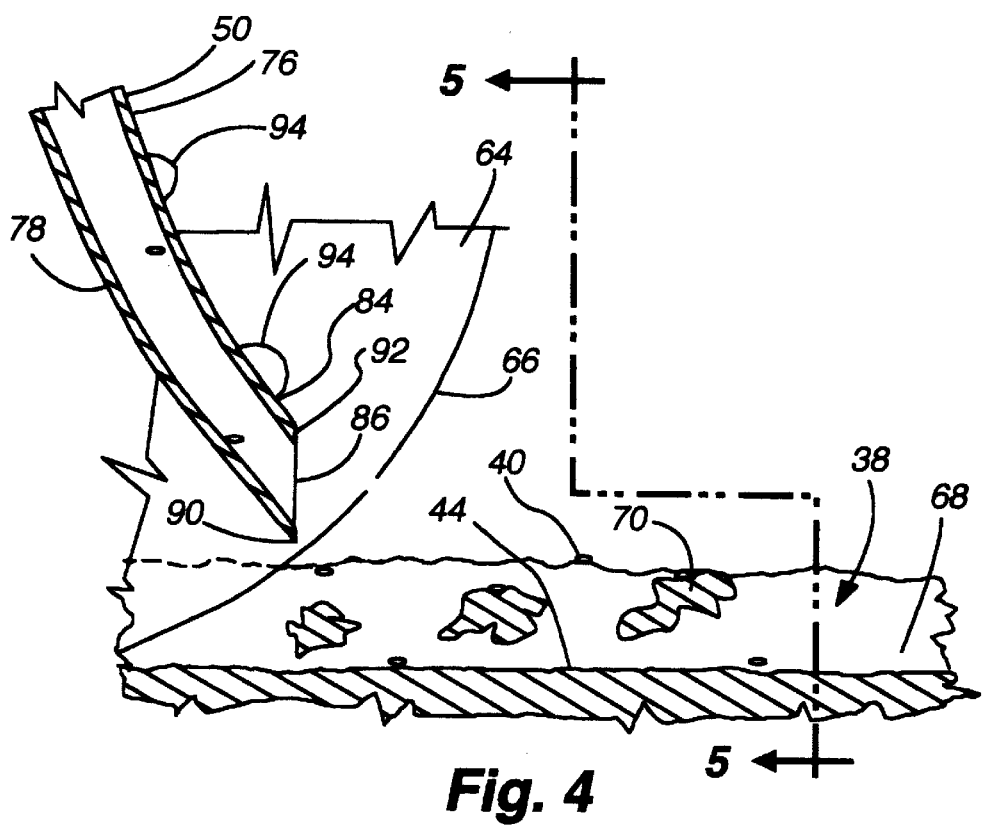
FIG. 4 is an enlarged representative section illustrating a seed tube depositing seeds into a furrow, and clumps of soil resting on the furrow sidewall.
Figure 5:
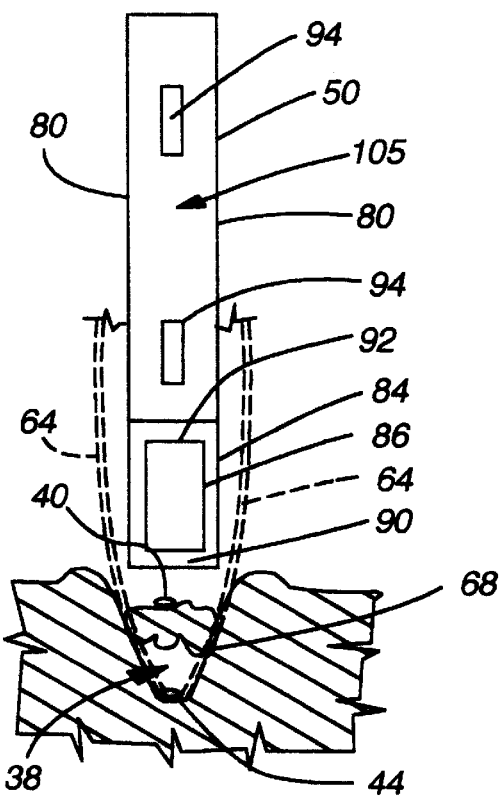
FIG. 5 is an enlarged section taken along line 5—5 of FIG. 4.

The furrow 38 formed by the furrow opener 56 is generally V-shaped, as shown in FIGS. 3, 4 and 5, with a bottom portion 44 forming the vertex where the upwardly and outwardly extending sidewalls 68 intersect. Under ideal soil conditions, the furrow 38 maintains the V-shape until closed by the furrow closer wheels 60. In moist conditions, the soil along the sidewalls 68 is pulled loose, causing portions 70 of soil to lodge in the bottom portion 44 of the furrow 38 and along the sidewalls 68. Also, as the disk blades 64 wear out, they become smaller in diameter and the adjacent edges 66 of the disk blades 64 become spaced apart. As the disk blades 64 wear down, the increased spacing between the adjacent edges 66 causes the furrow to gradually transform into a W-shape.

The seed tube 50 extends downwardly from the metering unit 48, between the disk blades 64, and is positioned directly over the seed furrow 38 adjacent to the rear 72 of the double disk blades 64, as shown in FIG. 2. The metering unit 48 regulates the distribution of seeds 40 from the seed hopper 46 to the seed tube 50. Thus, the seeds 40 are optimally evenly spaced along the seed furrow 38 as they fall from the seed tube 50.

As shown in FIGS. 3, 4, 6 and 9, the seed tube 50 is attached to and extends downwardly from the meter unit 48. The seed tube 50 has an elongated hollow main body 74, with a generally rectangular cross-sectional structure defining a rearwardly facing surface 76, a forwardly facing surface 78, and opposing side facing surfaces 80. The seed tube 50 has a slight arcuate shape along its length in the rearward direction. An upper end 82 of the seed tube 50 is attached to the meter unit 48, while a downwardly depending lower and trailing end 84 of the seed tube 50 depends downwardly between the disk blades 64 so as to be positioned over the center of the furrow 38. The downwardly depending end 84 defines an opening 86 through which the seeds 40 exit the seed tube 50 and fall into the furrow 38. The lower end 84 of the seed tube 50 is swept rearwardly from the upper end 82 as a result of the slight arcuate shape. The forwardly facing surface 78 of the seed tube 50 is longer than the rearwardly facing 76 surface of the seed tube 50, such that the forwardly facing surface 78 forms a lower edge 90 of the opening 86, while the rearwardly facing surface 76 of the seed tube 50 defines the upper edge 92 of the opening.

A pair of protrusions 94 extend from the rearwardly facing surface 76 of the seed tube 50 at a position adjacent the lower end 84 of the seed tube 50. The protrusions 94 are spaced longitudinally with respect to one another along the length of the seed tube 50. Each protrusion 94 can have an aperture 96 formed laterally therethrough.

The seed tube 50 guides the seeds to the furrow 38, as seen in FIGS. 3, 4 and 10. As the seeds 40 flow through the seed tube 50, they bounce around as a result of interaction with the walls of the seed tube 50 as well as the movement of the planter 30 over the ground. The rearward curve of the seed tube 50, as well as the orientation of the exit opening 86, are designed to compensate for the forward motion of the planter 30, and ideally the seeds 40 drop into the furrow 38 very gently. However, since the seeds 40 bounce as they move through the seed tube, they oftentimes drop out of the seed tube 50 at a less than optimal angle, or the seeds 40 bounce outwardly from the end 84 of the seed tube 50 prior to hitting the ground, causing the seeds 40 to then bounce upwardly.

The bouncing of the seeds 40 results in the seeds being disbursed throughout the furrow 38, not only along the bottom portion 44, but along the side walls 68 and often outside the seed furrow. The bouncing seeds 40 result in the seeds being improperly positioned within the furrow 38. The improper placement of the seeds within the furrow 38 results in various growth related problems as described above. Moving the planter 30 at a slower velocity reduces the bouncing problem, but does not eliminate it. Moving the planter 30 at a higher velocity to increase the planting process exacerbates the bouncing problem.

Figure 7:
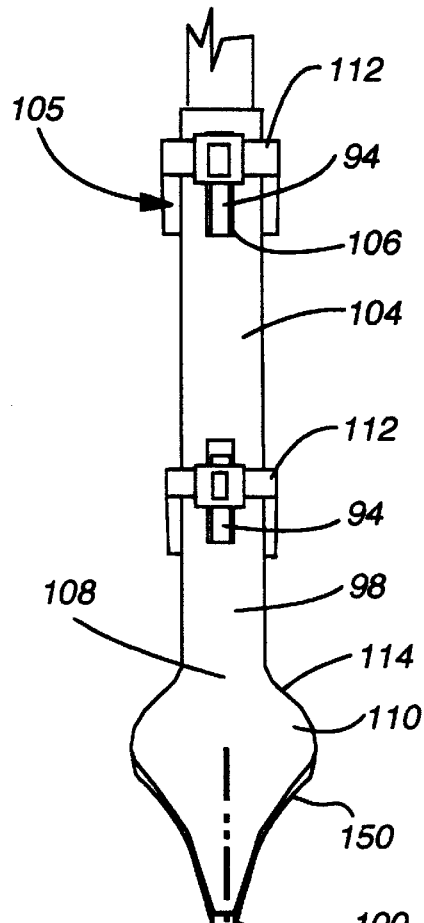
FIG. 7 is an enlarged partial rear view of the extension of the present invention as mounted on the seed tube.
Figure 6:
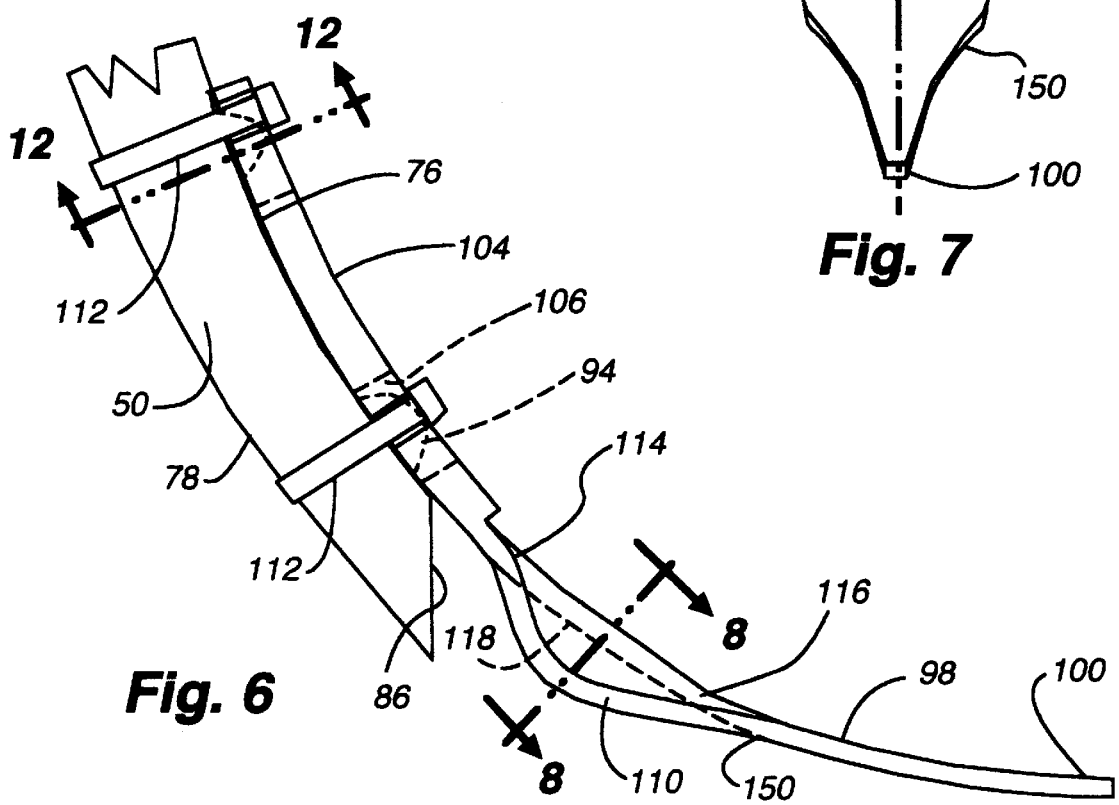
FIG. 6 is an enlarged partial side view of the extension of the present invention as mounted on the seed tube.
Figure 11:
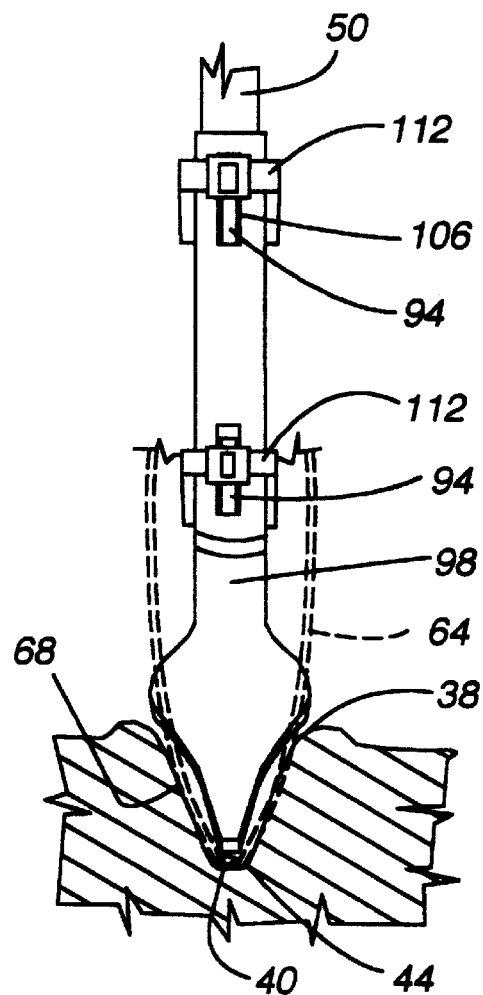
FIG. 11 is an enlarged section view taken along line 11—11 of FIG. 3.

As best seen in FIGS. 6, 7 and 9, the extension 98 of the present invention mounts on the rearwardly facing surface 76 of the seed tube 50 near its depending lower end 84. The extension 98 extends downwardly and rearwardly from the seed tube 50 into the furrow 38, preferably not contacting the side walls 68 (FIG. 11). The extension 98 extends to the bottom portion 44 of the furrow 38 and terminates at a position just above the vertex. The extension 98 substantially extends laterally across the width of the furrow 38 as it extends longitudinally down into the furrow.

With the extension 98 of the present invention mounted on the depending lower end 84 of the seed tube 50, as the seeds 40 exit the opening of the seed tube 50 and bounce from the seed tube, the seeds 40 contact the extension 98 and deflect back into the furrow 38. If the seeds 40 bounce more than once within the furrow 38, they will again contact the extension 98 further along its length and will again be deflected back into the furrow 38. As the seeds 40 come to rest in the bottom portion 44 of the furrow 98, the trailing end 100 of the extension 98 passes over the seeds 40 without contacting the seeds 40. The extension effectively funnels the seeds to the bottom of the furrow.

Referring to FIGS. 9, 13, 13A and 13B, a preferred embodiment of the extension 98 is shown, and has an elongated main body member 102 with a generally arcuate shape along its length, and is functionally divided into two segments along its length. The top segment 104 of the extension 98 is substantially rectangular in cross section, and defines a mounting structure 105 comprising two longitudinally spaced mounting apertures 106, as best seen in FIG. 9. The bottom segment 108 of the extension comprises laterally extended shoulder flanges 110 continuously narrowing to a minimum transverse dimension at the trailing end 100. In cross section, the bottom segment 108 of the extension 98 has a downwardly facing concave shape, and as the transverse dimension decreases to the trailing end 100, the cross section becomes substantially rectangular.

Figure 12:
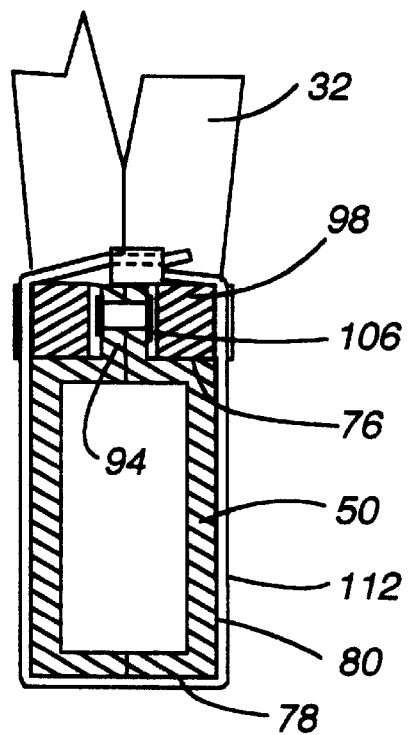
FIG. 12 is an enlarged section view taken along line 12—12 of FIG. 3.

In mounting the extension 98 to the seed tube 50, as best seen in FIGS. 6, 9 and 12, the top segment 104 of the extension 98 is releasably attached to the seed tube 50. More particularly, the protrusions 94 on the seed tube 50 are positioned within the apertures 106 formed in the top segment 104 of the extension 98. The engagement of the protrusions 94 in the mounting apertures 106 properly position the extension 98 on the seed tube 50, and acts to inhibit any longitudinal or transverse movement of the extension 98 with respect to the seed tube 50. Two releasable fasteners 112, such as plastic tie straps, are positioned around the extension 98 and the seed tube 50, and are releasably fastened thereto to hold the extension 98 securely in position on the seed tube 50.

The bottom segment 108 of the extension 98, when mounted on the seed tube 50, substantially continues the rearward curvature of the seed tube 50 in a direction opposite the movement of the planter 30, and curves generally in an upward direction away from the ground. The trailing end 100 of the extension 98 angles toward the ground.

As best seen in FIG. 3, the laterally opposing and downwardly extending shoulder flanges 110 are positioned with respect to the seed tube 50 such that the top edges 114 of the shoulder flanges 110 are positioned adjacent to and slightly rearwardly of the peripheral edges of the disk blades. The top edges of the shoulder flanges may contact the perimeter of both of the disk blades 64. The shoulder flanges I 10 extend across the width of the top of the furrow 38, at the furrow's widest dimension. As the bottom segment 108 of the extension 98 narrows toward its trailing end 100, the extension 98 extends downwardly into the furrow 38 and continues to substantially cover the furrow 38 at any given depth, as shown in FIG. 11. Again, the trailing end 100 of the extension 98 terminates in a position a sufficient distance above the bottom portion 44 of the furrow 38 such that as the extension 98 moves along through the furrow 38, the trailing end 100 of the extension 98 will not contact any seeds 40 laying in the furrow, and thus minimizes any contact damage to the seeds.

The bottom segment 108 of the extension 98 defines an upwardly convex top surface 116 and a downwardly concave lower surface 118, as shown in FIGS. 8 and 10. The downwardly concave lower surface 118 acts to deflect the bouncing seeds 40 toward the center of the furrow 38. The seeds 40 are thus directed toward and land in the bottom portion 44 of the furrow 38. This helps place the seeds 40 in the optimal position within the furrow 38, and helps reduce the number of seeds which come to rest on the side walls 68 or outside of the furrow 38. In short, the downwardly concave lower surface 118 of the bottom segment 108 of the extension 98 focuses the deflection of the seeds 40 toward the center and bottom portion 44 of the furrow 38, as shown in FIG. 10.

The transverse dimension of the lower surface 118 of the bottom segment 108 of the extension 98 becomes substantially planar adjacent to the trailing end 100 because the transverse dimension of the extension is substantially reduced, and a downwardly facing concave surface has less of an effect on the deflection of the seeds given the proximity of the trailing end to the bottom portion of the furrow. Also, very few seeds continue to bounce at that location on the extension.

The extension is flexible along its entire length so that in the event the trailing end of the extension comes into contact with the soil, the trailing end of the extension will easily bend upwardly to minimize any damage to a seed 40 that may be contacted. Furthermore, while the extension 98 is designed to not contact the sidewalls 68 of the furrow 38 during use, some incidental contact may occur. The flexibility of the extension 98 is beneficial during incidental contact with the soil because the extension bends to minimize any effect on the furrow.

The extension 98 is preferably formed from a high density polymer to prevent the extension from becoming clogged with mud or moist soils in the event it incidentally contacts soil as it moves through the furrow 38. Aside from its self-cleaning tendencies, other advantages of the polymer extension include its immunity from rust as well as its resistance to herbicides, insecticides and fertilizers which may be applied during planting. Thus, the extension is effective in all soil types and may be used with all existing planter row unit 32 attachments.

Figure 23:
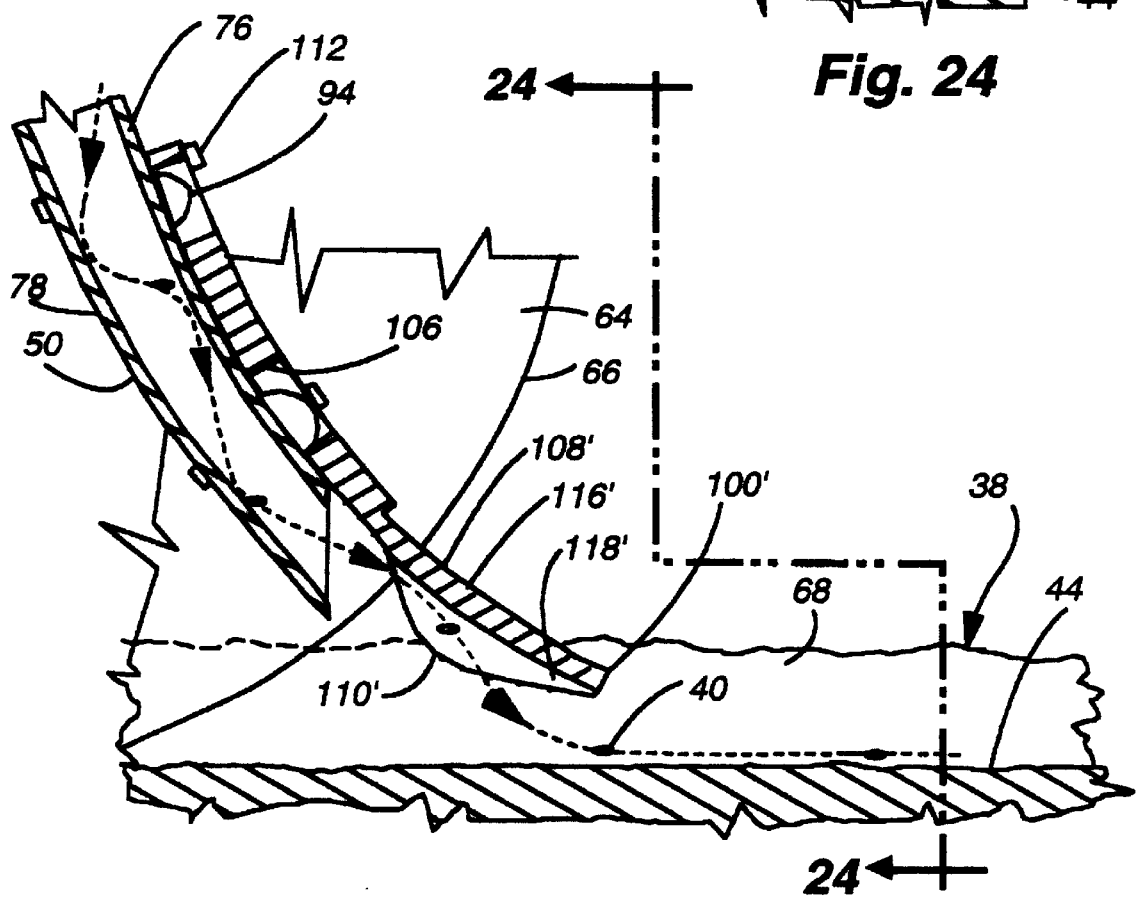
FIG. 23 is an enlarged representative section view illustrating the alternative embodiment of the extension of the present invention, as shown in FIG. 19, attached to the seed tube and extending into the furrow.

The mounting of the extension between the disk blades also helps to clean the inner edges of the disk blades at a location relatively close to the ground and hence the furrow, see FIGS. 10, 11, and 23. The extension is positioned closely to the inner sides of the disk blades near the ground, and act to scrape off mud and dirt stuck to the blades. Thus, any seeds trapped in the mud (in certain planting conditions) when the mud is scraped off are more likely to fall back into the furrow, as opposed to being dropped further away from the furrow when the mud comes off the disk blades by other means (typically further off the ground).

Figures 14, 15:
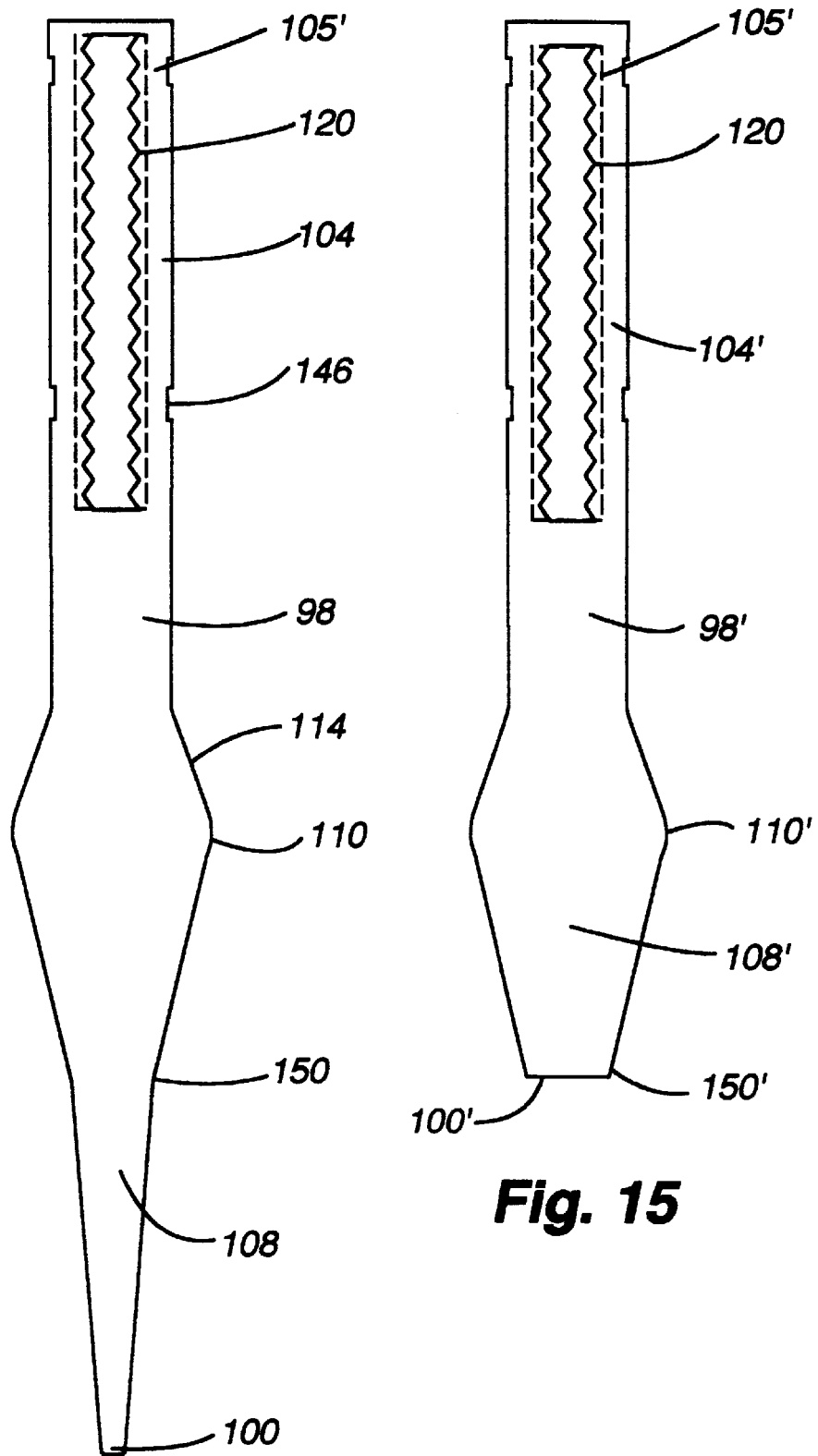
FIG. 14 is an enlarged plan view of the extension of the present invention, illustrating an alternative embodiment of the mounting structure formed in the top segment, particularly a slot.
FIG. 15 is an enlarged plan view of an alternative embodiment of the extension of the present invention.

An alternative mounting structure 105' for use in attaching the extension 98 to the rearwardly facing surface 76 of the seed tube 50, as shown in FIG. 15, includes an elongated slot 120 formed through the top segment 104' of the extension 98, and a corresponding insert 122. The slot 120 is oriented longitudinally along the length of the top segment 104' of the extension. The insert 122 defines two longitudinally oriented apertures 106 for receiving the protrusions 94 on the rearwardly facing surface 76 of the seed tube 50. The insert 122 is positionable at a variety of positions within the slot 120. The variety of positions allows for the bottom segment 108 of the extension 98 to be moved upwardly with respect to the seed tube 50 to compensate for the reduction in size of the disk blades 64 as they wear down. By moving the bottom segment 108 of the extension 98 upwardly with respect to the seed tube as the disk blades 64 decrease in size, the user can maintain the extension 98 in an optimal position in the furrow.

As shown in FIGS. 14, 16, 17 and 18, the top segment 104 of the extension 98 has a thickness dimension 124, including a top portion 126 and a bottom portion 128. The slot 120 formed through the top segment 104 of the extension defines two width dimensions. The slot 120 through the top portion 126 of the thickness dimension 124 defines laterally opposing, inwardly facing elongated sidewalls 130 spaced apart by a predetermined distance A. The slot 120 through the bottom portion 128 of the thickness dimension 124 defines laterally opposing, inwardly facing elongated sidewalls 132 spaced apart by a predetermined distance B, which is greater than the predetermined distance A. The opposing edges 130 of the slot 120 through the top portion 126 have a saw tooth configuration, while the opposing edges 132 of the slot 120 through the bottom portion 128 are planar. A first engagement surface 134 is formed between the longitudinal sidewalls 130 of the slot 120 in the top portion 126 and the longitudinal sidewalls 132 of the slot 120 in the bottom portion 128.

The insert 122 is elongated and has a thickness 136 divided into a top portion 138 and a bottom portion 140. The top portion 38 of the thickness 136 of the insert 122 has laterally spaced outwardly facing side walls 142 with a sawtooth configuration complimentary to the sawtooth configuration of the inwardly facing sidewalls 130 of the slot 120. The length of the insert 122 is sufficient to encompass the apertures 106 necessary for receiving the protrusions 94 from the rearwardly facing surface 76 of the seed tube. The bottom portion 140 of the insert 122 has a shape and dimension complimentary to the slot 120 formed in the bottom portion 128 of the top segment 104 of the extension 98. A second engagement surface 144 is formed at the transition between the top 138 and bottom 140 portions of the thickness 136 of the insert 122.

In operation, the insert 122 is received in the slot 120 of the extension 98 such that the sawtooth shaped outwardly facing side walls 142 of the insert 122 mesh with the sawtooth shaped inwardly facing side walls 130 of the slot 120 and longitudinally position the insert 122 in the slot 120. The bottom portion 140 of the insert 122 is received within the slot 120 in the bottom portion 128 of the top segment 104 of the extension 98. The first 134 and second 144 engagement surfaces mate to prevent the insert 122 from passing through the top segment 104 of the extension 98. Releasable fasteners 112, such as plastic tie straps are then utilized in the manner described above to attach the extension 98 to the rearwardly facing surface 76 of the seed tube 50.

If desired, grooves 146 can be formed in the edges of the top segment of the extension to receive the tie straps to help longitudinally position the extension 98 upon the seed tube 50.

Figure 13:
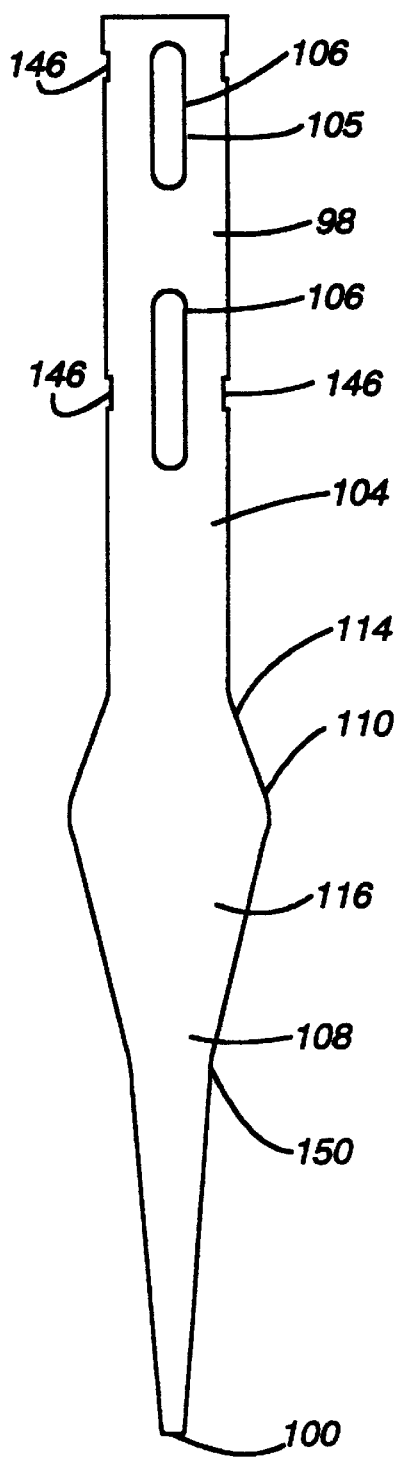
FIG. 13 is an enlarged plan view of the extension of the present invention, illustrating a top segment, a mounting structure formed in the top segment, a bottom segment, shoulder flanges, and a trailing end.
Figure 13A:
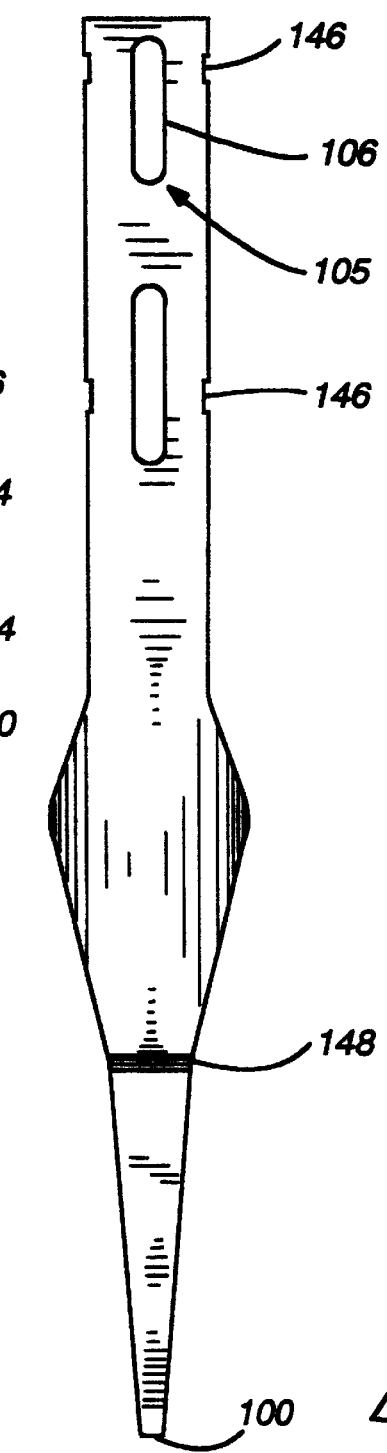
FIG. 13A is an enlarged plan view of the extension of the present invention as shown in FIG. 13, illustrating a groove across the bottom segment.
Figure 13B:
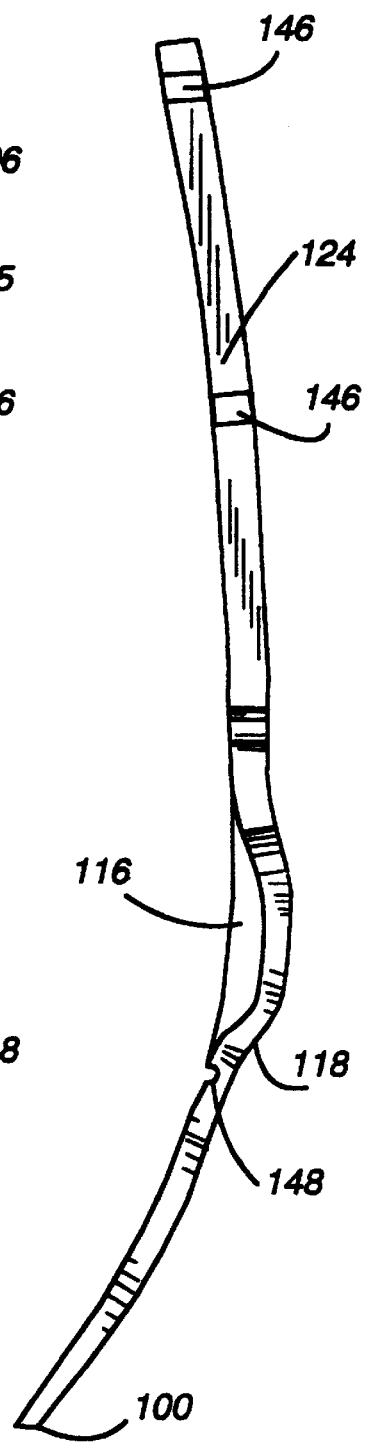
FIG. 13B is a side view of the extension of the present invention as shown in FIG. 13A.

In order to improve the flexibility of the trailing end 100 of the extension 98, an indentation 148 can be formed on the top surface of the extension 98 at a position centrally located in the bottom segment 108, preferably rearwardly from the lower edges 150 of the shoulder flanges 110, as shown in FIGS. 13A and B. The indentation 148 forms a living hinge in the bottom segment of the extension 98 which allows the trailing end 100 to bend upwardly more easily if the extension incidentally contacts the soil or seeds 40.

An alternative embodiment of the extension 98 can be seen in FIGS. 15 and 19 through 24. This alternative embodiment 98' has a top segment 104' identical to the first embodiment of the extension 98, and a modified bottom segment 108'. The bottom segment 108' of the second embodiment comprises the outwardly and downwardly extending shoulder flanges 110' forming an upper convex surface 116' and a lower concave surface 118'. The bottom segment 108' of the extension 98' terminates at a line transverse to the extension adjacent to the lower edge 150' of the shoulder flanges 110'.

Figure 24:
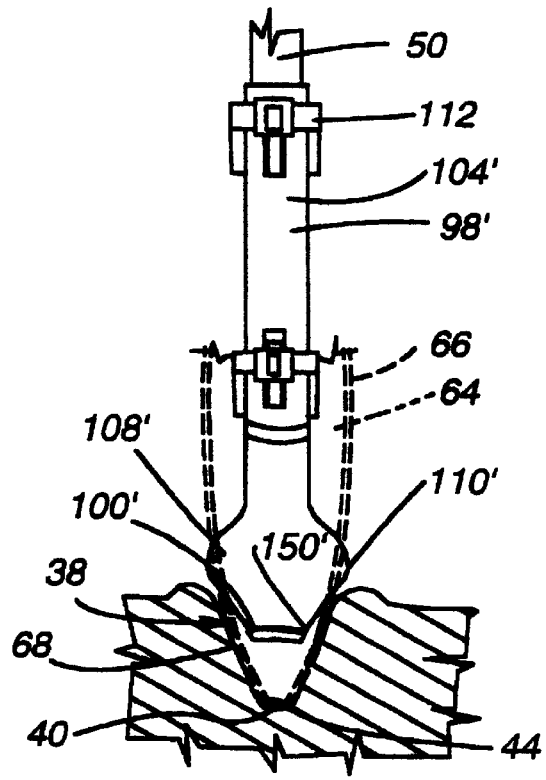
FIG. 24 is a section view taken along lines 24—24 of FIG. 23.

The second embodiment of the extension 98' is mounted to the seed tube 50 in the same manner as the first embodiment, and is positioned with respect to the disk blades in the same manner also. The bottom segment 108' does not extend through the furrow 38 to the bottom portion 44, but instead extends approximately only halfway down the side walls 68 of the furrow 38, as shown in FIGS. 23 and 24.

The portion of the extension 98' extending into the furrow 38 substantially covers the width of the furrow 38 along the length of the extension since the extension 98' narrows to the trailing end 100'. The second embodiment of the extension 98' exhibits the same deflection characteristics as the first embodiment. This second embodiment of the extension 98', however, decreases the likelihood of any contact between the extension 98' and the seeds 40 once the seeds have come to rest in the furrow 38, while maintaining a desirable level of deflection to position the bouncing seeds toward the center and bottom portion 44 of the furrow 38.

Figure 26:
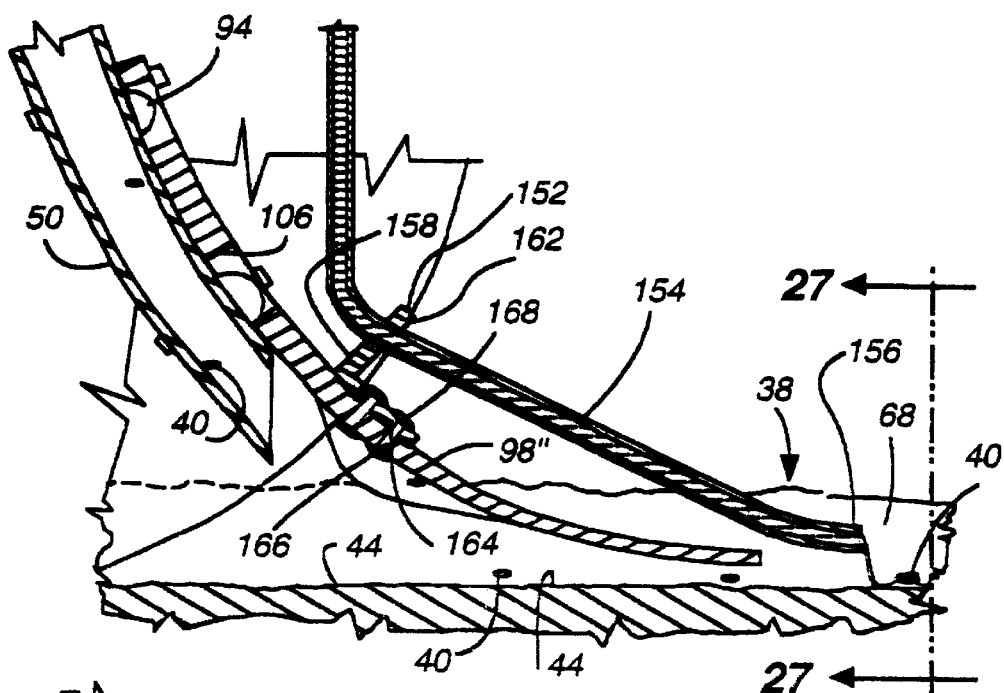
FIG. 26 is a representative section view of the extension of the present invention mounted on the seed tube, and illustrating the bracket mounted on the extension with a fertilizer tube placed through an aperture formed in the bracket.
Figure 27:
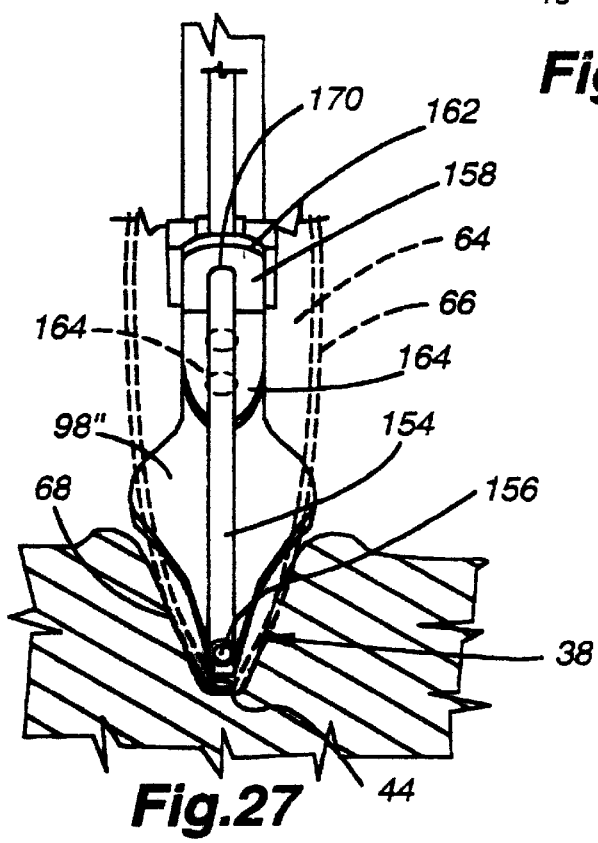
FIG. 27 is a section view taken along line 27—27 of FIG. 26.
Figure 25:
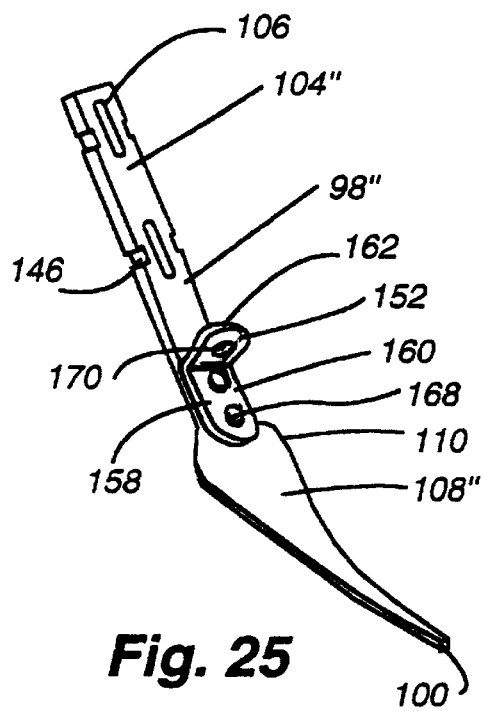
FIG. 25 is a perspective view of the extension of the present invention, illustrating a bracket mounted thereon.

A bracket 152 for holding a fertilizer tube 154 can be seen in FIGS. 25, 26, and 27. It is sometimes desired to place liquid starter fertilizer on the seeds 40 after they come to rest in the furrow 38, prior to the furrow being closed. The provision of a liquid fertilizer reservoir on the planter 30, and a fertilizer tube 154 extending from the reservoir to the furrow 38 is known.

The fertilizer tube 154 is attached to the bracket 152 on the extension 98 so that the end 157 of the tube 154 extends past the terminal end 100 of the extension 98. This positioning allows the application of fertilizer to the seeds 40 without the fertilizer building up on the extension 98 and making the soil around the extension 98 muddy. The bracket 152 has a flat, L-shaped main body member 158 defining a long leg 160 and a short leg 162 integrally formed together at substantially right angles. The long leg 160 defines a plurality of attachment apertures which correspond with bracket mounting apertures 166 formed in the top segment 104" of the extension 98", which are positioned below the mounting apertures 106 on the extension 98". The bracket 152 is attached to the extension 98 by fasteners 168, such as rivets, placed through the attachment apertures 164 on the bracket 152 and the bracket mounting apertures 166 on the extension 98".

The short leg 162 defines an aperture 170 therethrough for receiving the fertilizer tube 154, and assists in positioning the fertilizer tube 154 as described above.

The extension of the present invention has been described to this point as being attached to the seed tube extending downwardly and rearwardly from the row units 32 of planters 30. The extension 98 can also be used on drills 172, which are similar to planters 30 in that they open a furrow 38, place seeds 40 in the furrow, and close the furrow. A schematic representation of a drill can best be seen in FIGS. 28, 29 and 30. A drill 172 includes a furrow opener 56', shown as double disk openers 62' as described above, a hopper (not shown) positioned above the openers 62', and a chute 174 extending from the hopper down into the space between the disk blades 64'. The drill 172 utilizes a closer wheel (not shown) pulled behind the drill to push soil into the furrow 38 to cover the seeds 40. The major differences between drills 172 and planters 30 is that the drills form more closely spaced furrows than do planters, and as such they plant more seeds per unit area. They also do not have seed tubes 50 but instead have chutes 174. A scraper mechanism 176 is typically mounted on the drill 172 to rest against the inner sides of the disk blades 64' to scrape off accumulated mud.

The seeds 40 fall from the hopper in to the chute 174, and are then dropped from the chute substantially straight down between the disk blades 64' into the furrow 38. The inner sides 178 of the disk blades 64' funnel the seeds 40 into the furrow 38. Since the seeds 40 fall a relatively great distance, they are likely to bounce once they contact the furrow 38. The extension 98" can be attached to the scraper 176 by an L-shaped bracket 180, which defines an aperture 184 for receiving a releasable fastener, such as screw 186, as shown in FIGS. 28 and 29. The extension operates as described earlier to inhibit seed bounce. The top segment 104" of the extension 98" defines an aperture 182 for use in attaching the extension to the L-shaped bracket. The top segment 104" of the extension 98" is bent at a more severe angle, and is thus does not have a continuous arcuate shape, relative to the bottom segment 108" of the extension 98" since the L-shaped bracket extends more severely downwardly as compared to the seed tube on the planter.

The slot 120 and insert 122 can be formed on the extension 98" in order to allow adjustment of the bottom segment 108" in the furrow.

Figure 31:
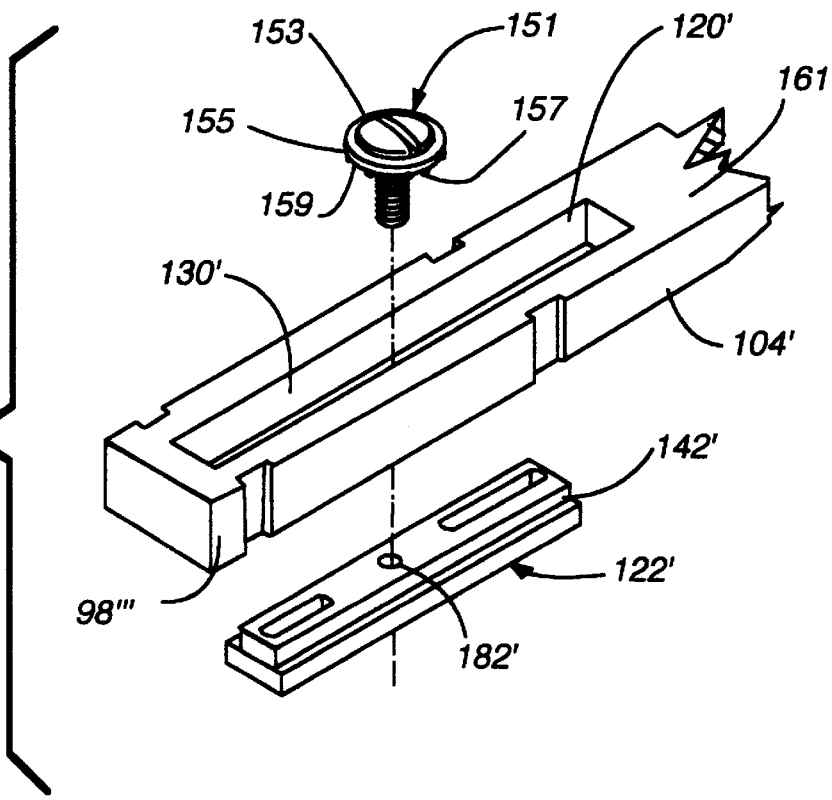
FIG. 31 is an enlarged exploded perspective view of an alternative embodiment of the mounting structure as shown in FIG. 14.

In another embodiment of the attachment structure 105', the slot 120' in the top segment 104' of the extension 98''' has straight, planar longitudinal edges 130', and the corresponding mating longitudinal edges 142' of the insert 122' are also straight and planar, as seen in FIG. 31.

Figure 32:
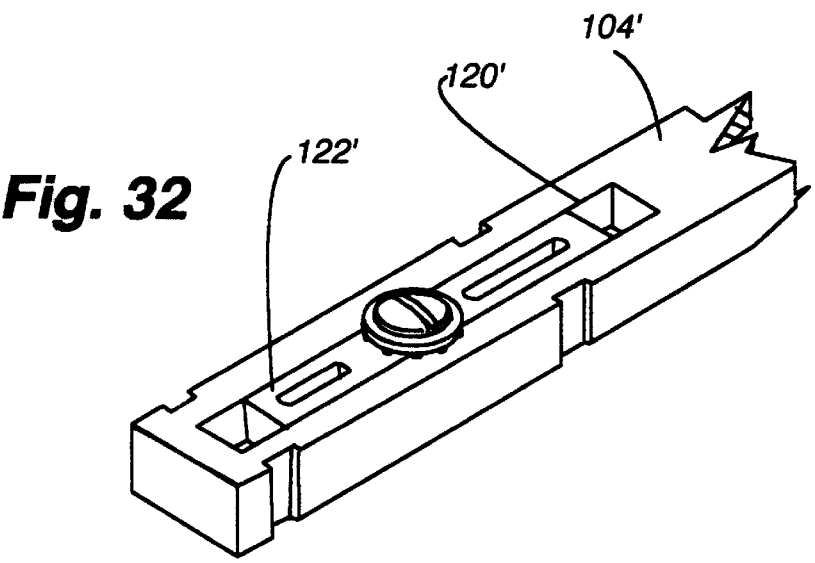
FIG. 32 is an enlarged perspective view of the embodiment of the mounting structure shown in FIG. 31 in its assembled state.

The insert 122' defines a threaded aperture 182' for receiving a threaded fastener 151. The threaded fastener 151 defines a head 153 having a wide annular flange 155, the wide flange having a plurality of serrations 157 on its lower surface 159. The fastener 152 preferably has an acme thread, and the aperture 182' is preferably pre-threaded with a complimenting acme thread pattern. The insert 122' is held in place on the top segment 104' of the extension by placing the insert 122' in mated engagement with the slot 120', as generally described above, inserting the threaded fastener 151 into the aperture 182' and tightening the threaded fastener 151 down sufficiently so that the bottom surface 159 of the flange 155 engages the top surface 161 of the upper segment 104' and draws the insert 122 tightly into the slot 120. The flange 155 extends across the width of the insert 122' and overlaps onto the top surface 161 of the top segment 104' (FIG. 32) to hold the insert 122' in a fixed relationship to the top segment 104'. The serrations 157 on the bottom surface 159 of the annular flange 155 grip the material of the extension 98''' to minimize the chance of the threaded fastener 151 loosening by unthreading.

To adjust the amount the extension 98''' extends beyond the seed tube 50, the fastener 151 is unscrewed from the aperture 182', by for instance a screw driver (not shown), a sufficient amount to disengage the bottom surface 159 of the flange 155 from the top surface 161 of the top segment 104' extension 98'''. The insert 122' can then be slid along the slot 120 to the desired position, at which time the fastener 151 is tightened into the aperture 182' to re-engage the bottom surface 159 of the flange 155 with the top surface 161 of the top segment 104'.

Alternatively in this embodiment of the mounting structure 105', as shown in FIG. 33, the fastener 151' can be received into the aperture 182" through the bottom of the insert 122', with a top portion 163 of the fastener 151' extending past the top surface 161 of the top segment 104'. The aperture 182" is preferably slightly undersized for the fastener 151', allowing the fastener 151' to tap its own thread. A nut 165, defining an annular flange 167 having a serrated lower surface 169, the flange 167 extending across the insert 122' and overlapping the top surface 161 of the top segment 104', is positioned on the fastener 151 and tightened thereto. The lower surface 169 is brought into engagement with the top surface 161 of the top segment 104' to fixedly position the insert to the extension 98"''.

The insert 122' can be repositioned in the slot 120' by loosening the nut 165, for instance with a wrench (not shown), to disengage the bottom surface 169 of the flange 167 from the top surface 161, sliding the insert 122' within the slot 120', and tightening the nut 165 back down. The head 171 of the fastener 151' is designed to fit flush with the bottom surface 173 of the insert 122' so as to not interfere with the attachment of the extension 98' to the seed tube 50.

An alternative embodiment of the extension of the present invention is shown in FIGS. 34 through 37. The alternative embodiment 250 mounts on the rearwardly facing surface 76 of the seed tube 50 near its depending lower end 84. The extension 250 extends downwardly and rearwardly from the seed tube into the furrow 38. The extension 250 extends to the bottom portion 44 of the furrow 38 and terminates at a position just above the vertex. The extension substantially extends laterally across the width of the furrow 38 as it extends longitudinally down into the furrow. With the extension of the present invention mounted on the depending lower end 84 of the seed tube 50, as the seeds 40 exit the opening of the seed tube 50 and bounce from the seed tube, the seeds 40 contact the extension and deflect back into the furrow 38. If the seeds bounce more than once within the furrow, they will again contact the extension further along its length and will again be deflected back into the furrow 38. As the seeds 40 come to rest in the bottom portion 44 of the furrow 98, the trailing end of the extension passes over the seeds.

This alternative embodiment of the extension 250 has an elongated main body 252 member with a generally arcuate shape along its length, and is functionally divided into two segments along its length. The top segment 254 of the extension is substantially rectangular in cross section, and defines a mounting structure 256 comprising two longitudinally spaced mounting apertures 257 as best seen in FIG. 34. The bottom segment 258 of the extension comprises laterally extending shoulder flanges 260 continuously narrowing to a minimum transverse dimension at the trailing end 262. In cross section, the bottom segment 258 of the extension 250 has an upwardly facing concave shaped surface, and a downwardly facing convex surface, and as the transverse dimension decreases to the trailing end 262, the cross section becomes substantially rectangular.

In mounting the extension 250 to the seed tube 50, as best shown in FIG. 35, the top segment 254 of the extension is releasably attached to the seed tube 50. More particularly, the protrusions 94 on the seed tube 50 are positioned within the apertures 257 formed in the top segment 254 of the extension 250. The engagement of the protrusions 94 and the mounting apertures 257 properly position the extension 250 on the seed tube 50, and acts to inhibit any longitudinal or transverse movement of the extension with respect to the seed tube. Two releasable fasteners 264, such as plastic tie straps, are positioned around the extension 250 and the seed tube 50, and are releasably fastened thereto to hold the extension 250 securely in position on the seed tube 50.

The bottom segment 258 of the extension, when mounted on the seed tube 50, substantially continues the rearward curvature of the seed tube in a direction opposite the movement of the planter, and curves generally in an upward direction away from the ground. The trailing end 262 of the extension 250 angles towards the ground. As best shown in FIGS. 34 and 35, the laterally opposing and upwardly extending shoulder flanges 260 are positioned with respect to the seed tube 50 such that the top edges 266 of the shoulder flanges are positioned adjacent to and slightly rearwardly of the peripheral edges of the disk blades 268. The top edges 266 of the shoulder flanges 260 may contact the perimeter of both of the disk blades 268. The shoulder flanges 260 extend across the width of the top of the furrow 38, at the furrow's widest dimension. As the bottom segment 258 of the extension 250 narrows towards its trailing end 262, the extension 250 extends downwardly into the furrow 38 and continues to substantially cover the furrow at any given depth. Again, the trailing end 262 of the extension 250 terminates in a position of sufficient distance above the bottom portion 44 of the furrow 38 such that as the extension moves along through the furrow 38, the trailing end 262 of the extension preferably will not contact the seeds laying in the bottom portion 44 of the furrow 38, and thus minimizes any contact damage to the seeds.

The bottom segment 258 of the extension 250 defines an upwardly concave top surface 270 and a downwardly convex lower surface 272, as shown in FIGS. 35 and 37. The downwardly convex lower surface 272 acts to deflect the bouncing seeds and keep them from bouncing out of the furrow 38. This action helps place the seeds 40 in the optimal position within the furrow 38, and helps reduce the number of seeds which bounce out of the furrow. In short, the downwardly convex lower surface of the bottom segment of the extension deflects the seeds similar to that shown in FIG. 10.

The transverse dimension of the lower surface 272 of the bottom segment 258 of the extension 250 becomes substantially planar adjacent to the trailing end 262 because the transverse dimension of the extension is substantially reduced. Also, very few seeds 40 continue to bounce at that location on the extension.

The extension 250 is flexible along its entire length so that in the event the trailing end 262 of the extension 250 comes into contact with the soil or the seeds, the trailing end of the extension will easily bend upwardly to minimize any damage. Furthermore, while the extension 250 is designed to not contact the sidewall of the furrow during use, some incidental contact may occur. The flexibility of the extension 250 is beneficial during incidental contact with the soil because the extension bends to minimize any effect on the furrow 38.

The extension 250 is preferably formed from a high density polymer to prevent the extension from becoming clogged with mud or moist soils in the event it incidentally contacts the soil as it moves through the furrow 38. Aside from its self-cleaning tendencies, other advantages of the polymer extension include its immunity from rust as well as its resistance to herbicides, insecticides, and fertilizers which may be applied during planting. Thus, the extension 250 is effective in all soil types and may be used with all existing planter row unit attachments.

The downwardly facing convex lower surface 272 of the lower portion 258 of the extension 250 also serves to minimize the clogging of the extension when the extension contacts the sidewalls of the furrow. The longitudinal edges 274 of the extension 250 may well contact the sidewalls of the furrow 38 as a result of several factors, including worn disks, uneven furrow depth, or bouncing. The downwardly convex surface 272 of the extension 250 reduces the amount of dirt scraped off the furrow walls when the longitudinal edges 274 engage the furrow walls.

In certain types of soil, the contact of the longitudinal edges 274 is beneficial. When the longitudinal edges 274 of the extension 250 contact the furrow wall, a layer of dirt is scraped off the furrow 38 wall towards the bottom 44 of the furrow. This dirt scraped from the sidewalls covers the seeds 40 positioned at the bottom 44 of the furrow and improves seed to soil contact and reduces the chance of air pockets near the seeds, which would cause early germination of the seed, and result in poor seed growth. In addition, the contact of the longitudinal edges of the extensions 250 (or of any of the embodiments) help the trailing end 262 of the extension 250 ride above the bottom of the furrow. The extension can also be adjusted vertically, such as by moving the fastener along a slot formed in the top segment or portion thereof, to allow for different furrow depths. In addition, contacting the side wall can smooth the side wall in some furrows.

This embodiment of the extension 250 is mounted to the seed tube 50 in the same manner as the previously described embodiments, and is positioned with respect to the disk blades in the same manner also. The alternative mounting structures described above for the other extension embodiments are also equally applicable to the mounting of this embodiment of the extension 250.

Preferably, the trailing end 262 of the extension 250 (and the previously mentioned extensions) is positioned approximately one-quarter to one-half of an inch above the bottom of the seed furrow 38, and should preferably not exceed the range of just above the bottom of the seed furrow to approximately three quarters of an inch above the bottom of the seed furrow 38.

Figure 51:
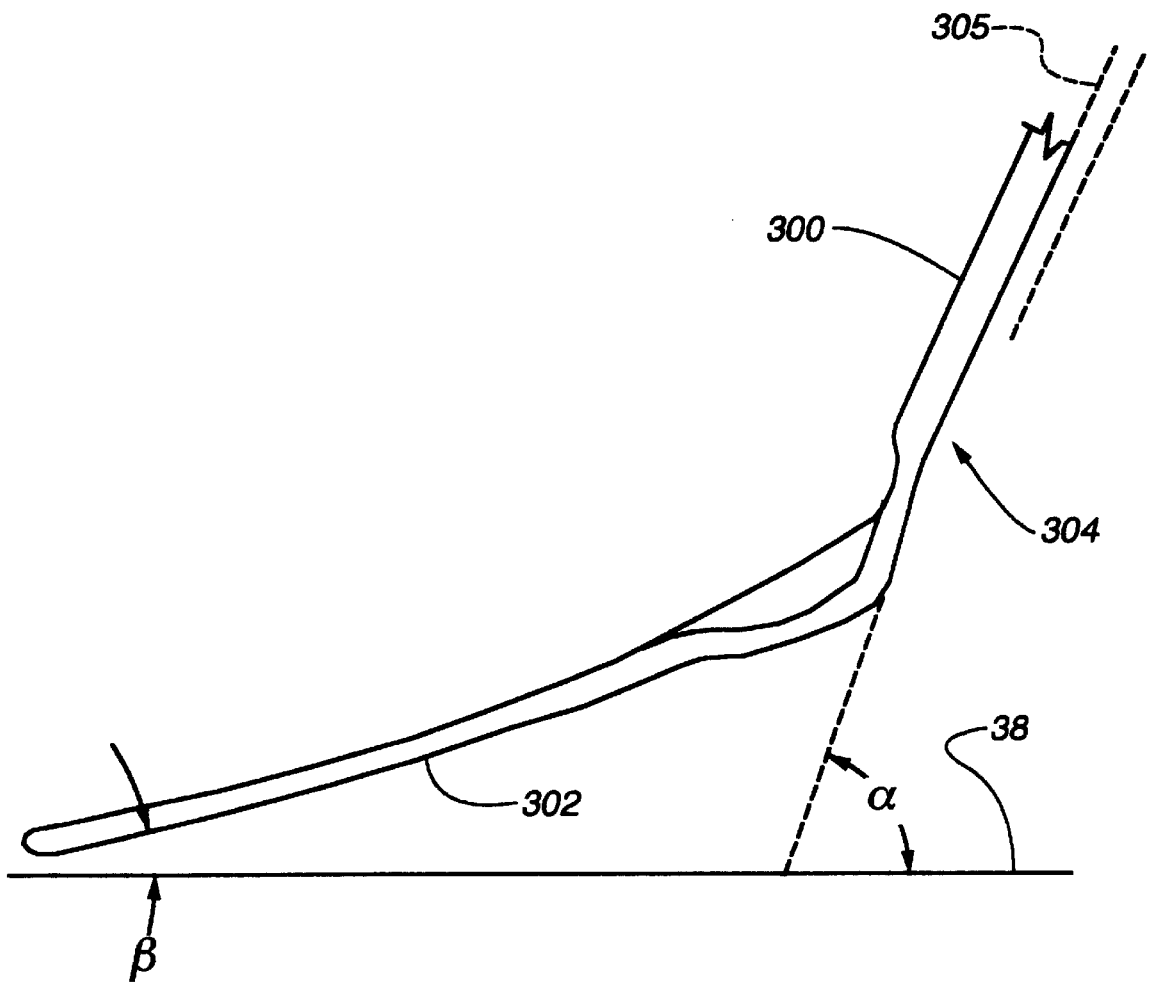
FIG. 51 shows a side view of an extension and preferable angular relationships between the extension and the furrow.
Figure 52:
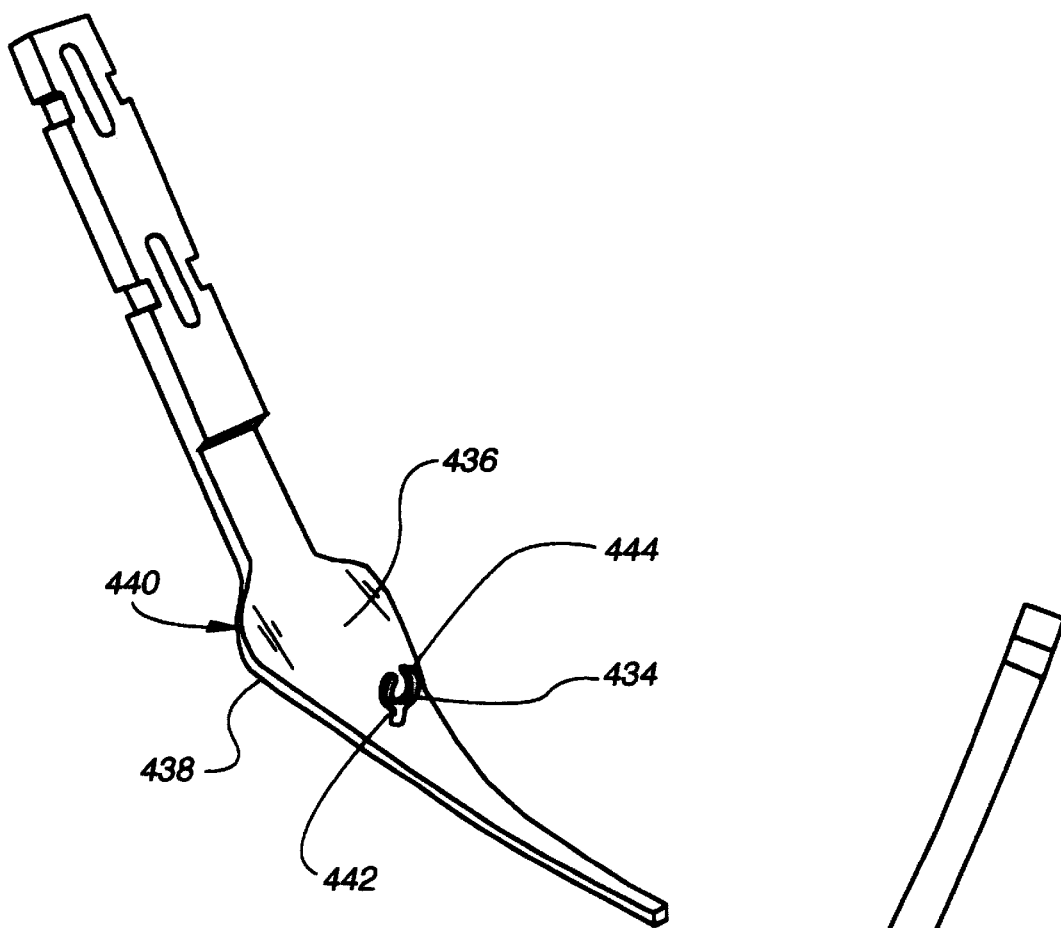
FIG. 52 shows an extension with a clip for attaching a fertilizer tube to the extension.
Figure 53:
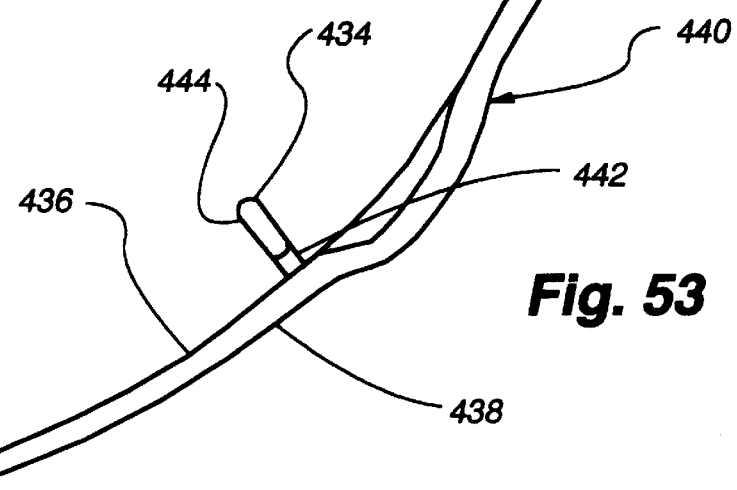
FIG. 53 shows a side view of the extension shown in FIG. 52.

The top portion 300 and the bottom portion 302 are angularly offset from one another. The angle between the top 300 and bottom 302 portions can be changed as necessary to facilitate the proper attachment to a particular implement (planter or drill) and to allow the bottom portion 302 of the extension 304 to be properly positioned over and into the furrow 38. FIG. 51 shows a preferred orientation of the extension 304, attached to a bracket 305, with respect to the furrow 38, where the top portion 300 is at an angle $\alpha$ of approximately 10 to 90 degrees, and preferably 70 degrees from the horizontal, while the bottom portion 302 is at an angle $\beta$ of approximately 5 to 45 degrees, and preferably 15 degrees from the horizontal.

The extensions described herein are not only able to be attached to the seed tube or planters for the proper extension into the seed furrow, but can also be attached to other parts of the planter or drill as is necessary with the proper attachment brackets. The proper attachment brackets, each having an upper end and a lower end, allow the extension to be attached to virtually any model of planter or drill available. For instance, with the appropriate attachment bracket such as those shown in FIGS. 38 through 46, the extension 250 can be attached to an International Harvester 5100, 5300 and 5400 model drills, in addition to the Great Plains drill, the John Deere 455, 515, 1520 and 8300 drills as well as the Tye drill.

Typically, when the extension 250 is mounted on a planter, the extension is attached to the seed tube 50, and when the extension is attached to a drill, the extension is normally attached to the scraper or another part of the drill since a drill type device does not use a seed tube. These attachment brackets for attachment of the extension 250 facilitate the secure placement of the extension 250 in the proper location to extend adequately into the seed furrow 38. The combination of the bracket and the extension is considered an attachment assembly.

Figure 39:
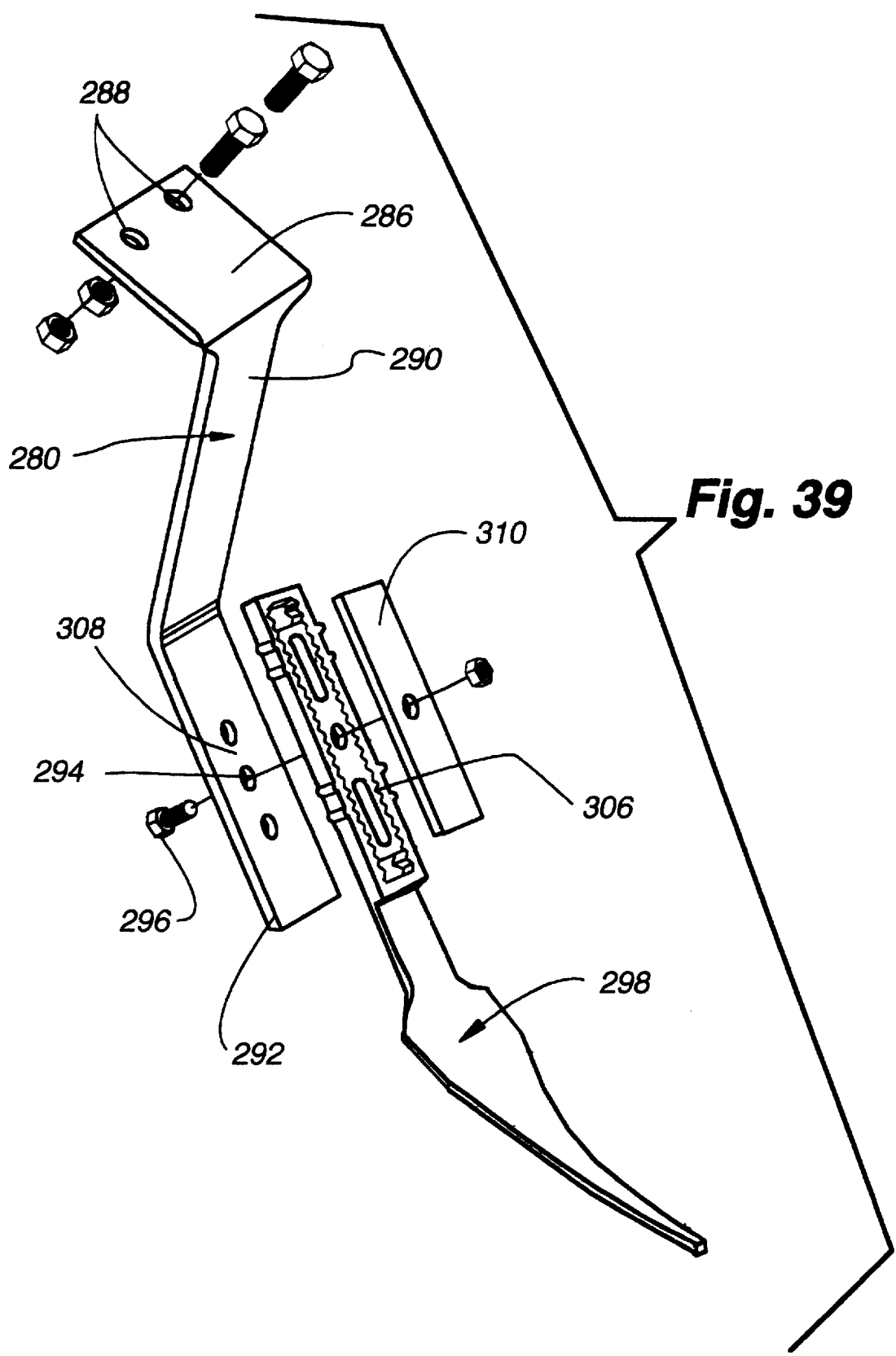
FIG. 39 is an exploded view of the bracket for attaching the extension to the International type drill shown in FIG. 38.

The attachment bracket 280 for use on the International Harvester 5100, 5300 and 5400 model drills is shown in FIGS. 38 and 39. These model drills include a support structure 282 having a downwardly oriented L-shape member 283 which supports the spaced disks 284 (only one shown). The bracket 280 includes three sections angulated from each adjacent section. The first or top section 286 is positioned relatively horizontally and defines two apertures 288 at one end for attachment to the support structure 282. The second section 290 depends substantially downwardly from the top section and forms an approximate right angle with the top section. The bottom section 292 extends downwardly and rearwardly at an obtuse angle from the middle section and defines an aperture 294 for receiving the attachment means 296, such as a bolt and nut, to secure the extension 298 thereto. The top portion 306 of the extension 298 rests on the top surface 308 of the third section of the bracket 280 and provides support to the extension 298. A brace plate 310 can be positioned on the top surface of the top portion 306 of the extension 298 to sandwich or clamp the top portion 306 of the extension securely to the bottom section 292 of the bracket 280.

The bracket 280 has a general Z-shape as described above, with the first section 286 being wider than the second 290 and third sections 292. The attachment of the extension 298 to the bottom downwardly and rearwardly extending third section 292 properly positions the extension 298 at the proper height and entry angle into the seed furrow 38. The brace plate 310 allows the extension 298 to be secured to the bottom section 292 of the bracket 280 with only one fastener 296, as shown in FIGS. 38 and 39. The top section 286 is approximately 2¼" wide and 3" long. The middle section 290 is approximately ⅞" wide and 7" long. The bottom section 292 is approximately ⅞" wide and 5" long. The bracket 280 is made of ¼" thick metal. The wide top section 286 allows for secure attachment to the structure 282 in preexisting apertures. The relatively thin second and third sections are advantageous for not interfering with the disks or the seed path. The length of the various sections is carefully designed so as to properly position with the extension in the furrow 38.

The bracket 312 for use with the Great Plains drill is shown in FIGS. 40, 41 and 42. The attachment bracket for the Great Plains drill includes a top 314, middle 316 and bottom 318 sections. The Great Plains drill includes a strut member 320 supporting the disks 322 and closer wheels 324. Closely adjacent to but behind the disks 322, and extending between the disks from the strut 320 is the scraper 326. The attachment bracket 312 attaches the extension 298 to the scraper 326.

The attachment bracket 312 includes the top 314, middle 316 and bottom 318 section forming a generally Z-shape. The top section 314 is relatively short (approximately 1" by 1") and defines an aperture 328 adjacent to the connection with the middle section 316. The middle section 316 (approximately 5" long by 1" wide) depends downwardly and forwardly, when mounted on the scraper 326, from the top section 314. The bottom section 318 (approximately 2½" long by 1" wide) is attached to the middle section 316 and depends downwardly and rearwardly from the middle section when the bracket 312 is affixed to the scraper 326, as shown in FIG. 41. The middle section 316 defines an aperture 330 at about its midpoint, and the bottom section 318 defines a pair of apertures 332. The aperture 330 in the middle portion 316 is used in conjunction with any known type of fastener 334 to attach the bracket 312 to the scraper 326.

One of the two apertures 332 in the bottom portion 318 is used to attach the top portion 306 of the extension 298 to the bottom portion 318 of the bracket 312, as shown in FIGS. 40, 41 and 42. The extension 298 attaches to a bottom or rearwardly facing surface 338 of the bottom section 318 of the bracket 312, and the top portion 306 of the extension 298 extends upwardly therefrom to form a V with the middle section 316 of the bracket 312, as best shown in FIGS. 40 and 41. A brace plate 340 can be used on the bottom or backside 342 of the top portion 306 of the extension 298 to clamp and firmly position, in conjunction with the fastener 334, the top portion 306 of the extension 298 to the bottom or forwardly facing surface 338 of the bottom section 318 of the bracket 312. The attachment bracket 312, having this particular shape and dimension, for the Great Plains drill places the extension 298 at the desired location in the seed furrow with respect to disks 322, that position being extending down into the seed furrow preferably without engaging the bottom portion of the seed furrow.

Figure 44:
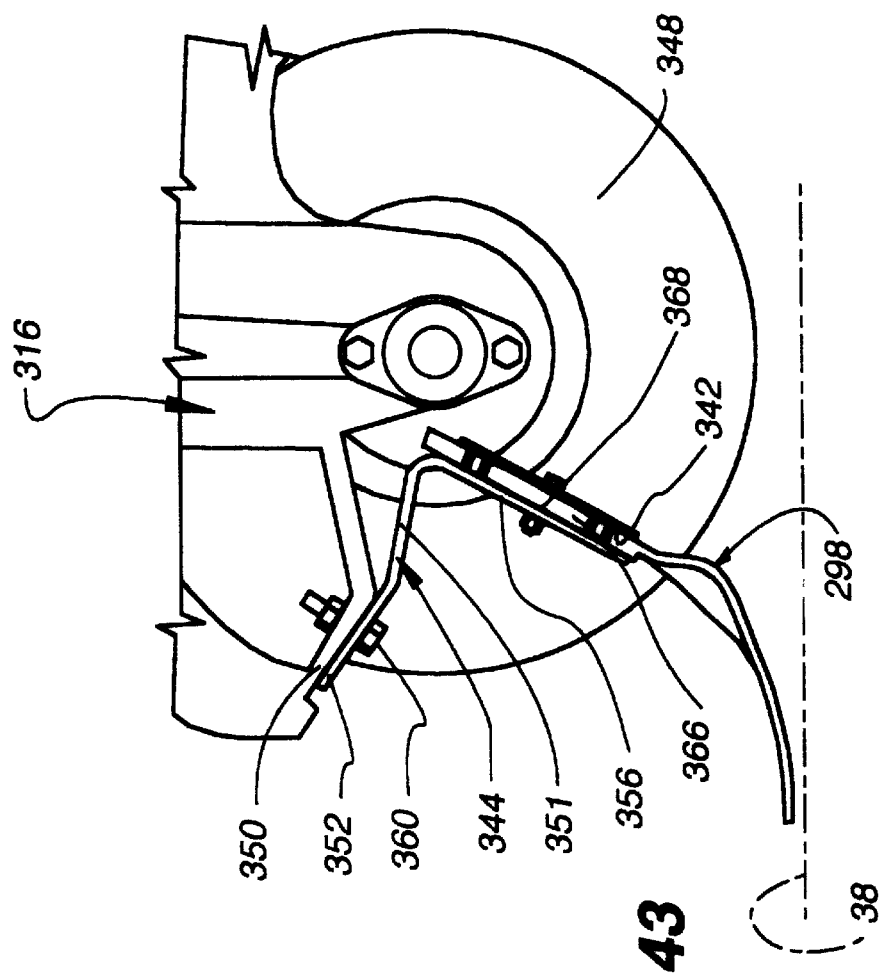
FIG. 44 is a representative view of a John Deere drill to which is attached the bracket and extension as shown in FIG. 43.
Figure 43:
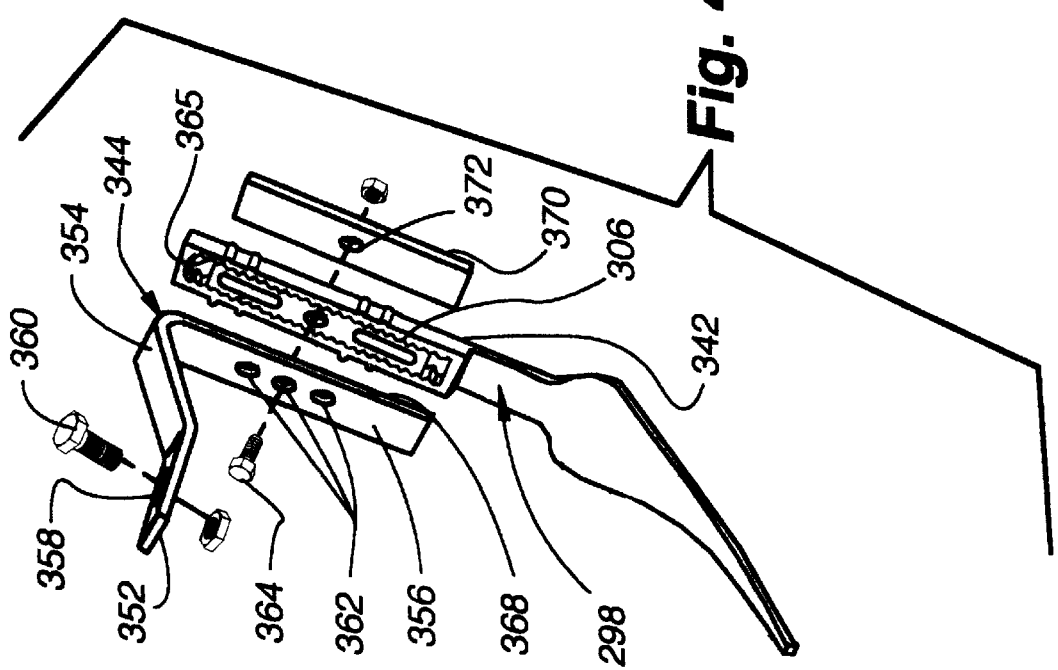
FIG. 43 is an exploded view of the bracket and extension, the bracket being for a John Deere model drill.

The attachment bracket 344 for use with the John Deere 455, 515, 1520 and 8300 model drills is shown in FIGS. 43 and 44. The John Deere drills mentioned above include a support structure 346 which supports the disks 348 (only one shown), as shown in FIG. 44. The bracket 344 attaches to the scraper 350 such that when the extension 298 is attached to the bracket 344 the extension 298 is placed in the desired position with respect to the disks 348 and in the furrow 38 itself. The bracket 344 has a general L-shape forming a top 352, middle 354 and bottom 356 section each angulated from the adjacent section. The top section 352 (approximately 2¼" long by 1" wide) defines an aperture 358 for use with any known fastener 360 such as a nut and bolt to attach the bracket 344 to the support structure 346 as shown in FIG. 44. When attached to the support structure 346, the top section 352 of the bracket 344 extends upwardly and rearwardly of the direction in which the drill is moved. The middle section 354 (approximately 2½" long by 1" wide) extends substantially horizontally in a forward direction from the first section 352. The third section 356 (approximately 4¼" long and 1" wide) extends downwardly and rearwardly from the middle section 354 and receives the top section 306 of the extension 298. The bottom section 356 of the bracket 344 defines an aperture 362 for use with a fastener 364 such as a nut and bolt to secure the top portion 306 of the extension 298 thereto. The top surface 366 of the top portion 306 of the extension 298 mates with the downwardly and forwardly facing surface 368 of the third section 356 of the bracket 344, as shown in FIG. 44. A brace plate 370, defining an aperture 372 therein, can be used to further secure and clamp the top portion 306 of the extension 298 to the third section 356 of the bracket 344. By attaching the extension 298 to the third section 356 of the bracket 344, the extension is positioned properly in the furrow 38 and with respect to the disks 348. The unique shape of the bracket 344 is important to the proper placement of the extension 298 in the furrow 38.

The attachment bracket 372 for use on the Tye drill is shown in FIGS. 45 and 46. The Tye drill includes a scraper 374, as shown in FIG. 46, positioned next to and in contact with the inside edge of the disks 376 (only one shown). The attachment bracket 372 for the Tye drill has two sections, an upper 378 and a lower 380 section. The upper section 378 (approximately 3½" long by 1" wide) has a continuous curve and is positioned in a upwardly and rearwardly directed orientation when attached to the scraper 374. The lower section 380 (approximately 2¼" long by 1" wide) extends downwardly and rearwardly at a substantially right angle to the end 382 of the upper section 378, for receiving the upper portion 306 of the extension 298. The upper section 378 of the bracket 384 defines an aperture 384 for receiving any type of fastener 386, such as a nut and bolt for attaching the bracket 372 to the scraper 374. The lower section 380 also defines an aperture 388 to receive a fastener 390, such as a nut and bolt, for attaching the upper portion 306 of the extension 298 thereto. A brace plate 392, defining an aperture 394, can be used to secure and clamp the upper portion 306 of the extension 298 to the back or rearwardly facing side 396 of the lower section 380 of the bracket 372. When the extension 298 is attached to the bracket 372 for the Tye drill, as described above, the extension is properly placed in the furrow 38 and in addition with respect to the disks 376.

Each of the brackets is made of a durable material, such as metal which allows some flexibility and deformability as is necessary. The transition between the different segments in each of the above brackets could be by curvature, while angular orientation between each of the segments is preferred. One of the benefits of these brackets in addition to allowing the extension to be used with many types of planters and drills is that it effectively connects the extension 298 to the planter or drill and allows the extension 298 to flex as necessary when the extension comes into contact with root balls, rocks or other obstacles. The attachment structure option set forth earlier in the specification can all be used to attach the extensions 298 to the brackets.

Figure 47:
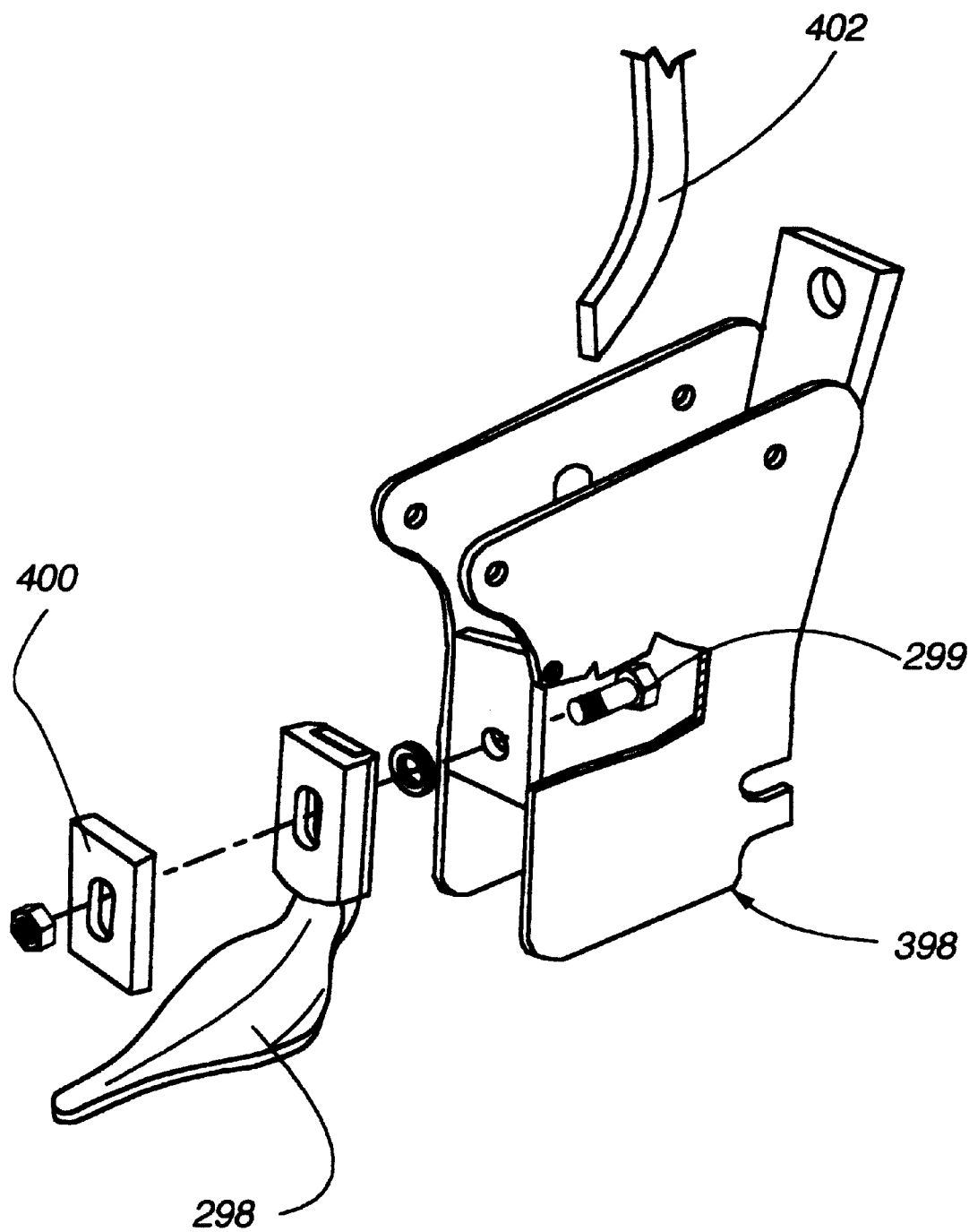
FIG. 47 is an exploded view of an extension for attachment to Case/IH model planters.

The extensions have been described herein as attaching to seed tubes on planters, and scrapers on drills. It is contemplated that since some drills also include seed tubes, the extensions can be attached to the appropriate structure given the particular device. In addition, some planters, such as the Case/IH 800, 900, 950, and 955 models, include a seed boot 398 as shown in FIG. 47 that is positioned between the disks (not shown). The extension 298 can attach, using a fastener 299, directly to the seed boot 398, and a brace plate 400 may be necessary to securely position the extension 298 to the boot 398. The seed tube 402 typically extends through the seed boot 398. Typically, the seed boot 398 does not form the furrow.

Figure 48:
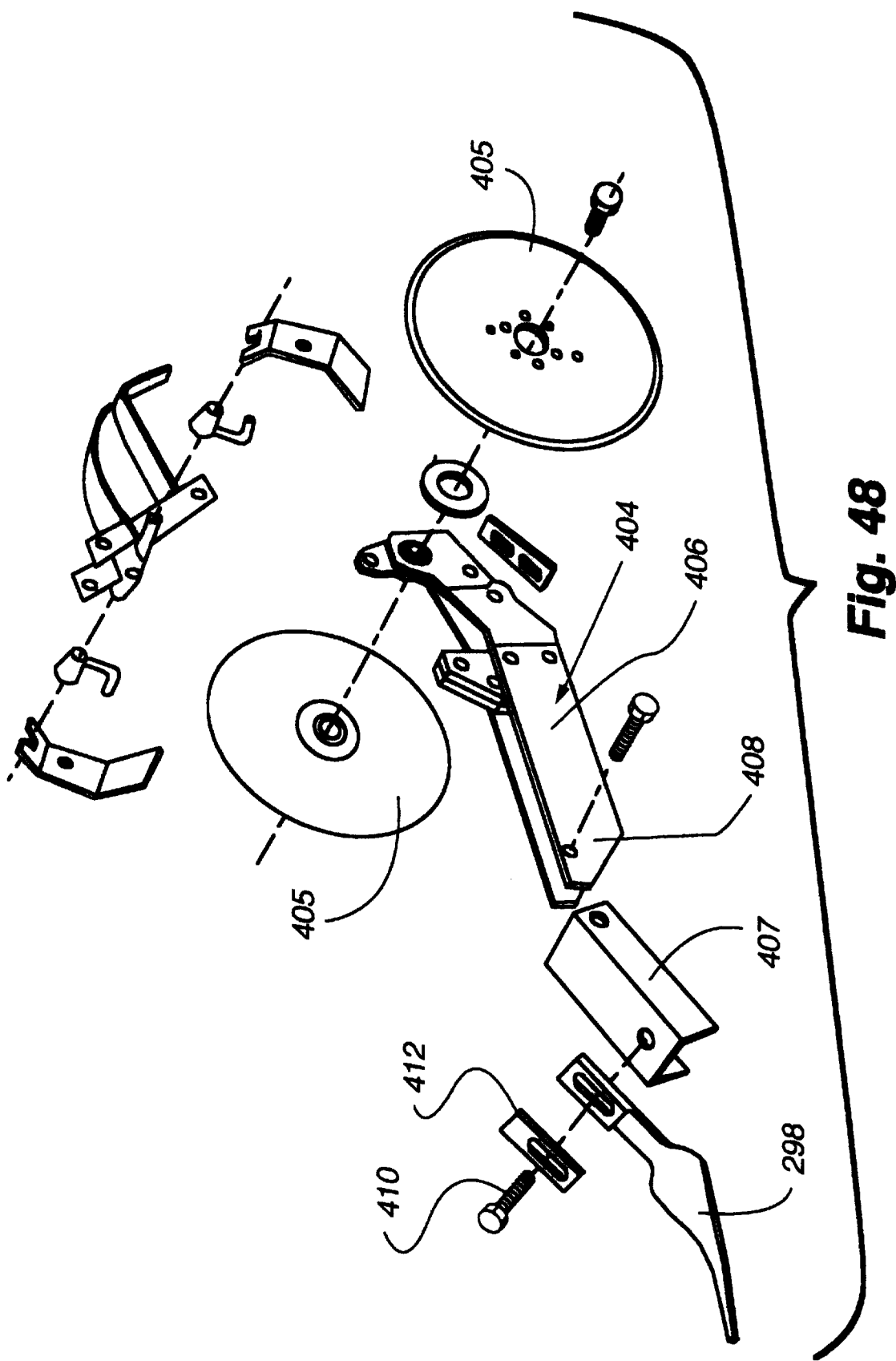
FIG. 48 is an exploded view of an extension for attachment to an IH model 56 planter.

In addition, some planters, such as the IH 56 model, include a seed shoe 404 (which includes a seed boot 406), as shown in FIG. 48. The seed shoe 404 is typically positioned between disks 405. The extension 298 can be attached to an intermediate support member 407, which in turn is attached to the rearward end 408 of the seed shoe 404, using a fastener 410, and optionally also with a brace plate 412 if a more sturdy connection is required. Typically, the seed shoe 404 does not form the furrow.

Further, the extensions 298 are able to be attached to the trailing end 414 of a runner/opener 416, such as that shown in FIG. 49. The front end 418 of the runner/opener 416 defines a plow blade 420 to form the furrow 38. The extension 298 is attached to the trailing end 414 of the runner/opener 416 using a fastener 422, such as a bolt and nut. Sometimes a transverse mounting brace 424 having an aperture 426 is required to be positioned on the runner/opener to which the extension 298 is secured.

Figure 50B:
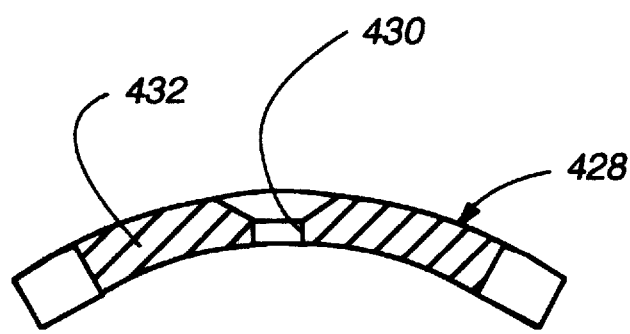
FIG. 50B shows a cross section taken along 50B—50B of FIG. 50A.
Figure 50A:
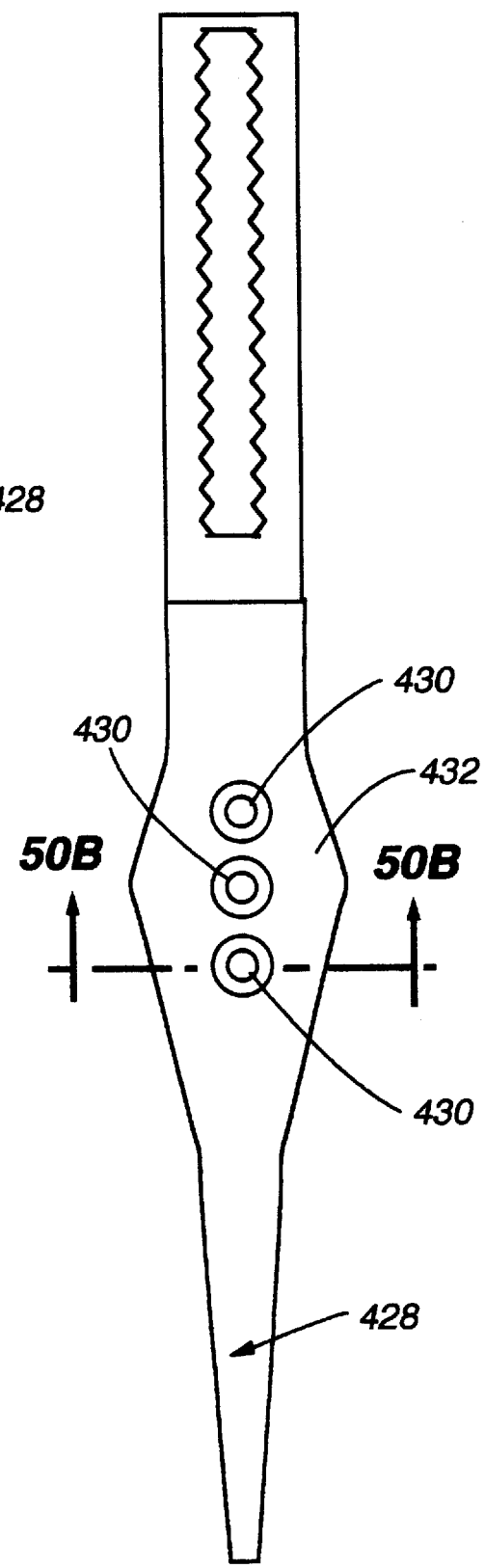
FIG. 50A shows a extension adapted for use with a granular or chemical fertilizer.

The extension 428, including each extension described in the embodiments above, is contemplated for use with granular fertilizer or chemicals. The granular fertilizer or chemical is typically applied to the bottom of the furrow from a point just behind the location where the seed is dropped (i.e. out of the seed tube). In order to facilitate the positioning of the granulated fertilizer or chemical in the bottom of the furrow, an aperture 430 is formed through the extension 428 in the lower portion 432 of the extension, as shown in FIG. 50. Preferably, there are a plurality of apertures 430, each with a sloped, or counter-sunk, profile to help funnel the granulated fertilizer or chemical through the apertures 430. Where the aperture 430 or apertures are positioned along the longitudinal centerline of the extension 428, the granulated fertilizer or chemical is more likely to reach the bottom portion of the furrow. The apertures 430 can be circular, oval, or elongated, and the plurality of apertures can be replaced by an elongated slot. However, the strength and integrity of the extension 428 is least affected by separate apertures 430.

A clip 434 for securing a fertilizer tube 154 (as shown in FIG. 26) can be positioned on the top surface 436 of the bottom portion 438 of the extension 440 for releasably securing the tube thereto. Preferably, the clip 434 is positioned on the longitudinal centerline of the extension. The clip generally has a stem 442 attached to the extension 440, and a C-shaped receptacle 444 attached to the top of the stem 442 for securely receiving a tube 154. The clip 434 helps maintain the desired position of the fertilizer tube on the extension 440 and in the furrow. Without the clip 434, the end of the tube adjacent the end of the extension can move relatively freely and can possibly even ride outside of the furrow, which would detrimentally affect the application of the fertilizer and reduce its beneficial effects.

Presently preferred embodiments of the present invention and many of its improvements have been described with a degree of particularity. This description has been made by way of preferred example and is based on a present understanding of knowledge available regarding the invention. It should be understood, however, that the scope of the present invention is defined by following claims, and not necessarily by the detailed description of the preferred embodiment.

What is claimed is:

1. An extension for properly placing seeds in a furrow for use with a furrow opener for creating a seed furrow and for placing seeds within said seed furrow, the seed furrow having a centrally located bottom portion and upwardly and outwardly extending sidewalls defining a maximum width dimension, and the sidewalls intersecting at a vertex in the bottom portion and defining a minimum width dimension, such that said furrow has a decreasing width, said extension comprising:
   a. an elongated flexible body member defining a general arcuate shape which provides a generally downwardly and rearwardly sweeping orientation, and also defining an upper segment and a lower segment;
   b. said upper segment attachable to the furrow opener:
   c. said lower segment configured to depend downwardly and rearwardly from the furrow opener and extendible into the furrow, said lower segment having a lower surface having a downwardly convex shape, and said lower segment having a width dimension decreasing along its length, the width dimension substantially equal to but less than the decreasing width of the furrow as the lower segment extends into the furrow; and
   d. said lower segment terminating at a trailing end, said trailing, end configured to be spaced above the centrally located bottom portion of the furrow.

2. An extension as defined in claim 1, wherein said downwardly facing convex lower surface transforms along the length of the lower segment of the extension to a downwardly facing planar lower surface at said trailing end.

3. An extension as defined in claim 2, wherein said lover segment includes opposing shoulders.

4. An extension as defined in claim 3, wherein:
   a. said shoulders having a width dimension including a top edge defining a largest width dimension of said shoulders, and a lower edge defining a smallest width dimension of said shoulders;
   b. said width dimension of said shoulders decreasing from said top edges to said lower edges; and
   c. said extension terminating at said lower edges.

5. An extension as defined in claim 1, wherein the furrow opener is a planter having a seed tube, with the extension attachable to the seed tube.

6. An extension as defined in claim 1, wherein the furrow opener is a drill having a scraper, with the extension attachable to the scraper.

7. An extension for properly placing seeds in a furrow for use with a seed planter having a furrow opener for creating a seed furrow, a seed tube for placing seeds within said seed furrow, and a closing device for closing said seed furrow, the seed furrow having a centrally located bottom portion and upwardly and outwardly extending sidewalls defining a maximum width dimension, and the sidewalls intersecting at a vertex of the bottom portion and defining a minimum width dimension, such that said furrow has a decreasing width; said seed tube extension comprising:

a. an elongated flexible body member defining a general arcuate shape, and also defining an upper segment and a lower segment;

b. said upper segment having an attachment structure and being attachable to the seed tube, said extension extending beyond the seed tube when attached thereto;

c. said lower segment configured to depend downwardly and rearwardly from the seed tube and extendible into tile furrow, said lower segment having a downwardly convex lower surface, and the extension having a width dimension decreasing along its length, the width dimension substantially equal to but less than the decreasing width of the furrow as tile lower segment extends into the furrow so that the lower segment does not contact the sidewalls of the furrow; and d. said lower segment terminating at a trailing end, said trailing end configured to be spaced above the centrally located bottom portion of the furrow.

8. An extension as defined in claim 7, wherein the seed tube has a downwardly depending lower end and a rearwardly facing surface, aid wherein a protrusion extends from the rearwardly facing surface adjacent to the upper segment of the extension, and wherein said attachment structure further comprises:

a. an aperture formed in said upper segment of said extension to receive the protrusion; and b. a releasable fastener to secure said extension to the seed tube.

9. An extension as defined in claim 8, wherein said attachment structure further comprises:

a. a longitudinal slot formed in said upper segment of said extension; and b. an insert fixedly positionable in said slot, and defining said aperture for receiving the protrusion.

10. An extension as defined in claim 9, wherein:

a. said slot defines laterally opposing, inwardly facing sidewalls defining a first sawtooth pattern;

b. said insert defines laterally opposing, outwardly facing sidewalls defining a second sawtooth pattern corresponding to said first sawtooth pattern; and c. said insert positionable in said slot such that said first and second sawtooth patterns mate together and fixedly position said insert in said slot.

11. An extension for properly placing seeds in a furrow for use with a drill having a furrow opener for creating a seed furrow having at least one disk blade, a chute for dropping the seeds into said seed furrow, and a closing device for closing said seed furrow, a scraper apparatus attached to the furrow opener for cleaning the disk blade, and the seed furrow having a centrally located bottom portion and upwardly and outwardly extending sidewalls defining a maximum width dimension, and the sidewalls intersecting at a vertex of the bottom portion and defining a minimum width dimension, and the sidewalls having a decreasing width between the maximum width dimension and the minimum width dimension, said extension comprising:

a. an elongated flexible body member defining a general arcuate shape, and also defining an upper segment and a lower segment;

b. said upper segment defining an attachment structure for releasable engagement to the scraper apparatus, said extension configured to extend beyond the disk blade;

c. said lower segment configured to depend downwardly and rearwardly from the furrow opener and to extend into the furrow, said lower segment having a downwardly facing convex lower surface, and having a width dimension decreasing along its length, the width dimension substantially equal to but less than the decreasing width of the furrow as the lower segment extends into the furrow so that the lower segment does not contact the furrow; and d. said lower segment terminating at a trailing end, said trailing end configured to be spaced above the centrally located bottom portion of the furrow.

12. An extension for properly placing seeds in a furrow for use with a furrow opener for creating a seed furrow and for placing seeds within said seed furrow, the seed furrow having a centrally located bottom portion and upwardly and outwardly extending sidewalls defining a maximum width dimension, and the sidewalls intersecting at a vertex in tile bottom portion and defining a minimum width dimensions such that said furrow has a decreasing width, said extension comprising:

a. an elongated flexible body member defining a general arcuate shape which provides a generally downwardly and rearwardly sweeping orientation, and also defining an upper segment and a lower segment;

b. said upper segment attachable to the furrow opener;

c. said lower segment configured to depend downwardly and rearwardly from the furrow opener and extendible into the furrow said lower segment having a lower surface having a downwardly convex shape, and said lower segment having a width dimension decreasing along its length the width dimension substantially equal to but less than the decreasing width of the furrow as the lower segment extends into the furrow;

d. said lower segment terminating, at a trailing end, said trailing end configured to be spaced above the centrally located bottom portion of the furrow;

e. said downwardly facing convex lower surface transforms along the length of the lower segment of the extension to a downwardly facing planar lower surface at said trailing end; and f. said lower segment includes opposing, shoulders, and said opposing shoulders extend outwardly and upwardly.

13. An extension for properly placing seeds in a furrow for use with a furrow opener for creating a seed furrow and for placing seeds within said seed furrow, the seed furrow having a centrally located bottom portion and upwardly and outwardly extending sidewalls defining a maximum width dimension, and the sidewalls intersecting at a vertex in the bottom portion and defining a minimum width dimension, said extension comprising:

a. an elongated flexible body member having an upper segment and a lower segment;

b. said upper segment attachable to the furrow opener;

c. said lower segment configured to depend downwardly and rearwardly from the furrow opener and extend into the furrow, and said lower segment having a downwardly facing convex lower surface and a width dimension decreasing along its length; and d. said lower segment terminating at a trailing end, said trailing end configured to be spaced above the centrally located bottom portion of the furrow.

14. An extension for properly placing seeds in a furrow for use with a drill having a furrow opener for creating a seed furrow having at least one disk blade, a chute for dropping the seeds into said seed furrow, and a closing de ice for closing said seed furrow, a scraper apparatus attached to the furrow opener for cleaning the disk blade, and the seed furrow having a centrally located bottom portion and upwardly and outwardly extending sidewalls defining a maximum width dimension, and the sidewalls intersecting at a vertex of the bottom portion and defining a minimum width dimension; said extension comprising:

a. an elongated flexible body member having an upper segment and a lower segment;

b. said upper segment defining an attachment structure for releasable engagement to the scraper apparatus, said extension extending beyond the disk blade;

c. said lower segment depending downwardly and rearwardly from the furrow opener and extending into the furrow and having a downwardly facing convex lower surface and a width dimension decreasing along its length; and d. said lower segment terminating at a trailing end, said trailing end spaced above the centrally located bottom portion of tile furrow.

15. An extension assembly for properly placing seeds in a furrow for use with a drill having a furrow opener having at least one disk blade for creating a seed furrow, and a chute for dropping the seeds into said seed furrow, said extension assembly comprising:

a. a bracket having an upper end and a lower end, said upper end for attachment to the drill and said lower end extending downwardly and rearwardly from the drill;

b. an extension including an elongated body member which provides a generally downwardly and rearwardly orientation, and also defining a upper segment and a lower segment;

c. said upper segment attachable to said lower end of said bracket;

d. said lower segment configured to depend downwardly and rearwardly from the bracket and extendible to the furrow, said lower segment having a downwardly concave surface in a direction substantially transverse to the length of the lower segment.

16. An extension assembly as defined in claim 15, wherein said bracket further comprises:

a. a top segment, middle segment, and bottom segment, the middle segment formed at substantially a right angle to the top segment, the bottom segment formed at substantially an obtuse angle to the middle segment;

b. said extension being attached to said bottom segment; wherein said bracket positions said extension in the furrow when attached to the drill.

17. An extension assembly as defined in claim 16, wherein said bottom segment extends downwardly and rearwardly of the drill.

18. An extension assembly as defined in claim 15, wherein said bracket further comprises:

a. a top segment, middle segment, and bottom segment, said top segment attachable to the drill, the middle segment formed at a substantially obtuse angle to and depending downwardly from the top segment, the bottom segment formed at substantially an obtuse angle to and extends downwardly and rearwardly away from the middle segment;

b. said extension being attached to said bottom segment; wherein said bracket positions said extension in the furrow.

19. An extension assembly as defined in claim 15, wherein said bracket further comprises:

a. a top segment, middle segment, and bottom segment, said top segment attachable to the drill, the middle segment formed at a substantially obtuse angle to and depending forwardly and upwardly from the top segment, the bottom segment formed at substantially an acute angle to and extends downwardly and rearwardly away from the middle segment;

b. said extension being attached to said bottom segment; wherein said bracket positions said extension in the furrow.

20. An extension assembly as defined in claim 15, wherein said bracket further comprises:

a. a top segment, and a bottom segment, said top segment attachable to the drill and curving downwardly and forwardly, the bottom segment formed at a substantially right angle to and depending downwardly away from the middle segment;

b. said extension being attached to said bottom segment; wherein said bracket positions said extension in the furrow.

21. An extension for properly placing seeds in a furrow for use with a furrow opener for creating a seed furrow and for placing seeds within said seed furrow, the seed furrow having a centrally located bottom portion and upwardly and outwardly extending sidewalls defining a maximum width dimension, and the sidewalls intersecting at a vertex in the bottom portion and defining a minimum width dimension, said extension comprising:

a. an elongated flexible body member defining a general arcuate shape which provides a generally downwardly and rearwardly sweeping orientation, and also defining a upper segment and a lower segment;

b. said upper segment attachable to the furrow opener;

c. said lower segment configured to depend downwardly and rearwardly from the furrow opener and extendible into the furrow;

d. an aperture formed through said lower segment; and e. said lower segment terminating at a trailing end, said trailing end configured to be spaced above the centrally located bottom portion of the furrow.

22. An attachment assembly for properly placing seeds in a furrow for use with a drill having a furrow opener having at least one disk blade for creating a seed furrow, and a chute for dropping the seeds into said seed furrow, said attachment assembly comprising:

a. a bracket having an upper end and a lower end, said upper end for attachment to the drill and said lower end extending downwardly and rearwardly from the drill;

b. an extension including an elongated body member which provides a generally downwardly and rearwardly orientation, and also defining an upper segment and a lower segment;

c. said upper segment attachable to said lower end of said bracket; and d. said lower segment configured to depend downwardly and rearwardly from the bracket and extendible to the furrow, said lower segment having a downwardly convex surface in a direction substantially transverse to the length of the lower segment, and said lower segment having an upwardly concave surface in a direction substantially transverse to the length of the lower segment.

23. An attachment assembly as defined in claim 22, wherein said bracket further comprises:

a. a top segment, middle segment, and bottom segment, the middle segment formed at substantially a right angle to the top segment, the bottom segment formed at substantially an obtuse angle to the middle segment;

b. said extension being attached to said bottom segment; wherein said bracket positions said extension in the furrow when attached to the drill.

24. An attachment assembly as defined in claim 23, wherein said bottom segment extends downwardly and rearwardly of the drill.

25. An attachment assembly as defined in claim 22, wherein said bracket further comprises:

a. a top segment, middle segment, and bottom segment, said top segment attachable to the drill, the middle segment formed at a substantially obtuse angle to and depending downwardly from the top segment, the bottom segment formed at substantially an obtuse angle to and extends downwardly and rearwardly away from the middle segment, b. said extension being attached to said bottom segment, wherein said bracket positions said extension in the furrow.

26. An attachment assembly as defined in claim 22, wherein said bracket further comprises:

a. a top segment, middle segment, and bottom segment, said top segment attachable to the drill, the middle segment formed at a substantially obtuse angle to and depending forwardly and upwardly from the top segment, the bottom segment formed at substantially an acute angle to and extends downwardly and rearwardly away from the middle segment;

b. said extension being attached to said bottom segment; wherein said bracket positions said extension in the furrow.

27. An attachment assembly as defined in claim 22 wherein said bracket further comprises:

a. a top segment, and a bottom segment, said top segment attachable to the drill and curving downwardly and forwardly, the bottom segment formed at a substantially right angle to and depending downwardly away from the top segment;

b. said extension being attached to said bottom segment; wherein said bracket positions said extension in the furrow.

* * * * *